(12) United States Patent
Bruske

(10) Patent No.: US 7,311,753 B2
(45) Date of Patent: Dec. 25, 2007

(54) METHOD AND DEVICE FOR THE PRODUCTION OF PARTICLES FROM LIQUID STARTING MATERIALS

(75) Inventor: Alfred Bruske, Munster (DE)

(73) Assignee: Frank Bruske, Wolfenbuttel (DE)

( * ) Notice: Subject to any disclaimer, the term of this patent is extended or adjusted under 35 U.S.C. 154(b) by 596 days.

(21) Appl. No.: 10/467,257

(22) PCT Filed: Feb. 6, 2002

(86) PCT No.: PCT/EP02/01276

§ 371 (c)(1),
(2), (4) Date: Feb. 17, 2004

(87) PCT Pub. No.: WO02/062461

PCT Pub. Date: Aug. 15, 2002

(65) Prior Publication Data

US 2004/0134311 A1 Jul. 15, 2004

(30) Foreign Application Priority Data

Feb. 6, 2001 (DE) ................................ 101 05 156

(51) Int. Cl.
*B22F 9/06* (2006.01)
(52) U.S. Cl. ........................................ 75/335; 266/202
(58) Field of Classification Search .................. 75/335; 266/202, 201
See application file for complete search history.

(56) References Cited

U.S. PATENT DOCUMENTS

| 4,150,201 A | 4/1979 | Silveyra |
| 4,393,021 A | 7/1983 | Eisenberg et al. |
| 6,511,524 B2 * | 1/2003 | Nozawa ........................ 75/335 |
| 6,554,166 B2 * | 4/2003 | Sato et al. ................... 266/202 |

FOREIGN PATENT DOCUMENTS

| CH | 664 298 A5 | 2/1988 |
| DE | 40 13 811 A 1 | 10/1991 |
| DE | 44 24 998 C 2 | 6/1996 |
| DE | 196 17 924 A 1 | 11/1997 |
| DE | 196 19 811 A1 | 1/1998 |
| JP | 06184607 | 7/1994 |
| JP | 07251001 | 10/1995 |
| WO | WO96/32242 | 10/1996 |
| WO | WO01/00311 A1 | 1/2001 |

* cited by examiner

*Primary Examiner*—Scott Kastler
(74) *Attorney, Agent, or Firm*—Salter & Michaelson

(57) ABSTRACT

A method for the production of solid particles from a liquid medium includes the steps of forming a liquid film between an impact screen and an impact mass, the screen having an opening therethrough, moving the impact mass to effect a mechanical impulse on the film, such that a part of the film is discharged through the opening in droplet form. The discharged liquid droplets are moved to a solidification medium wherein the liquid droplets are solidified to form solid particles.

29 Claims, 14 Drawing Sheets

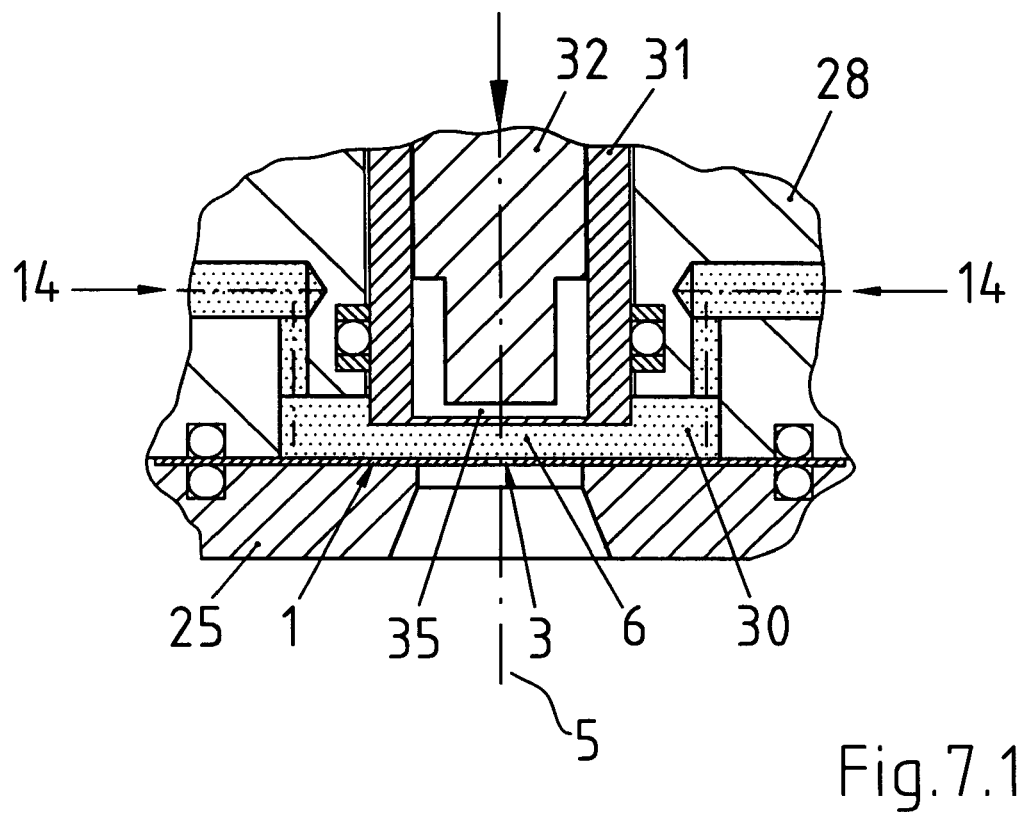
Fig. 7.1
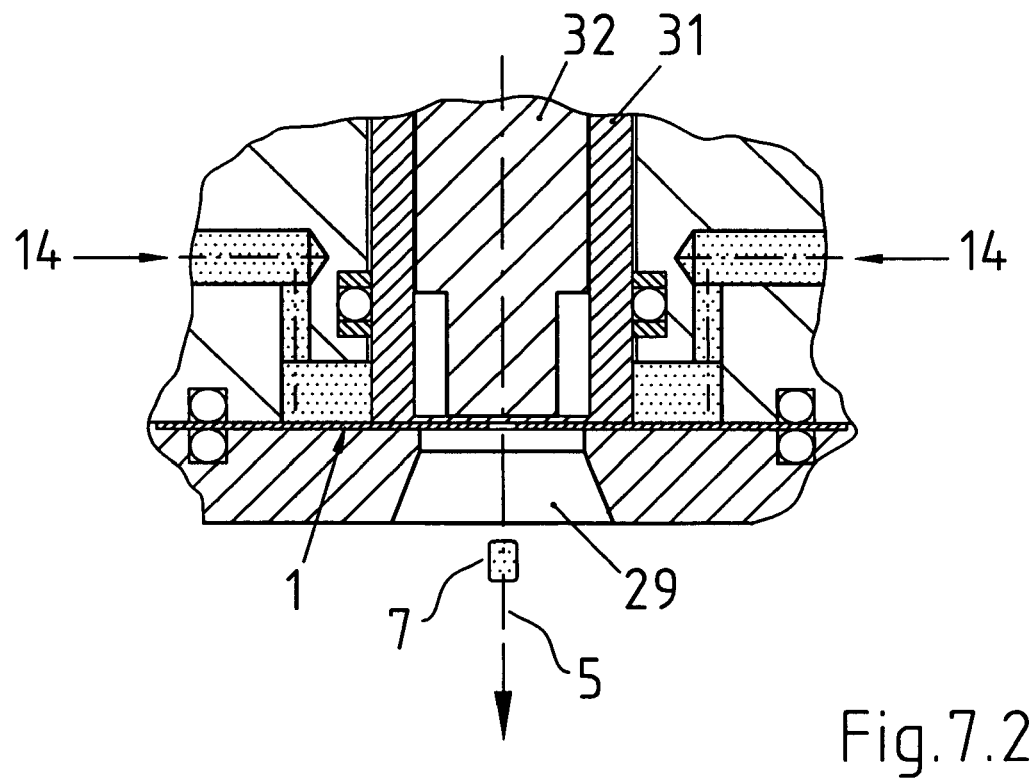
Fig. 7.2

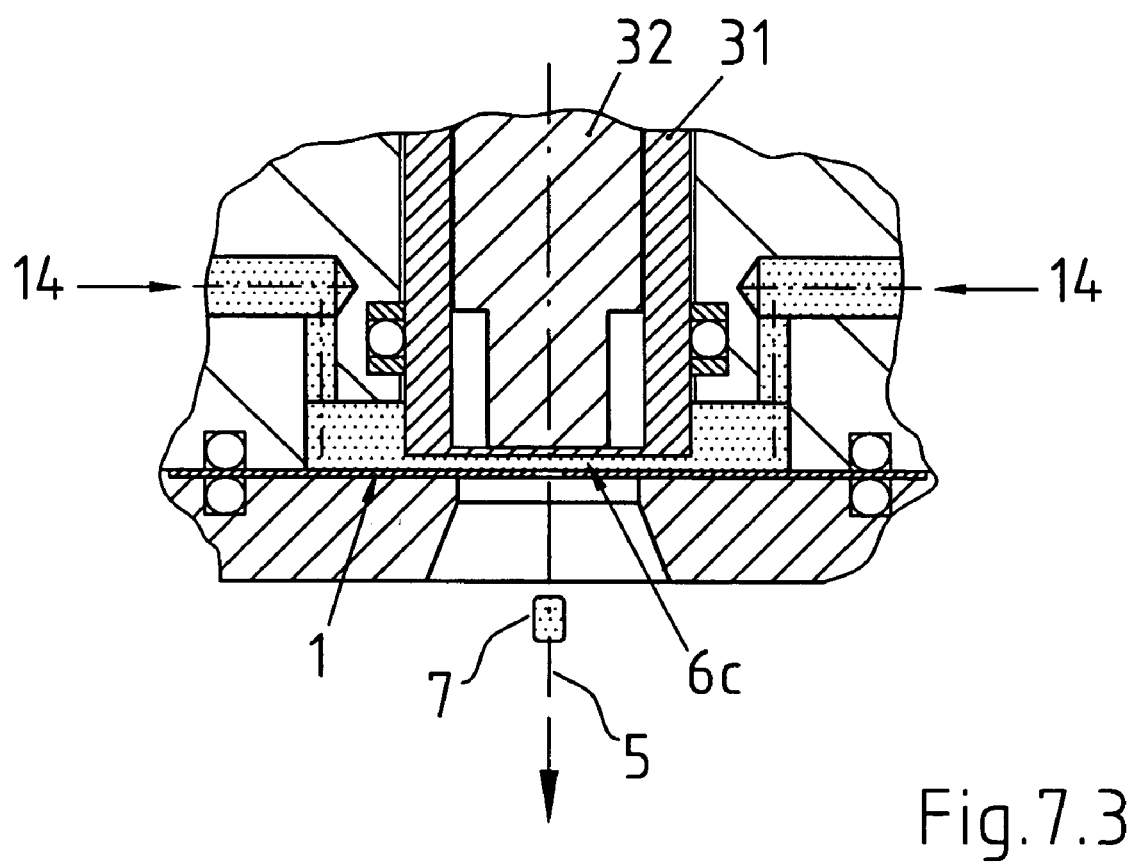
Fig. 7.3

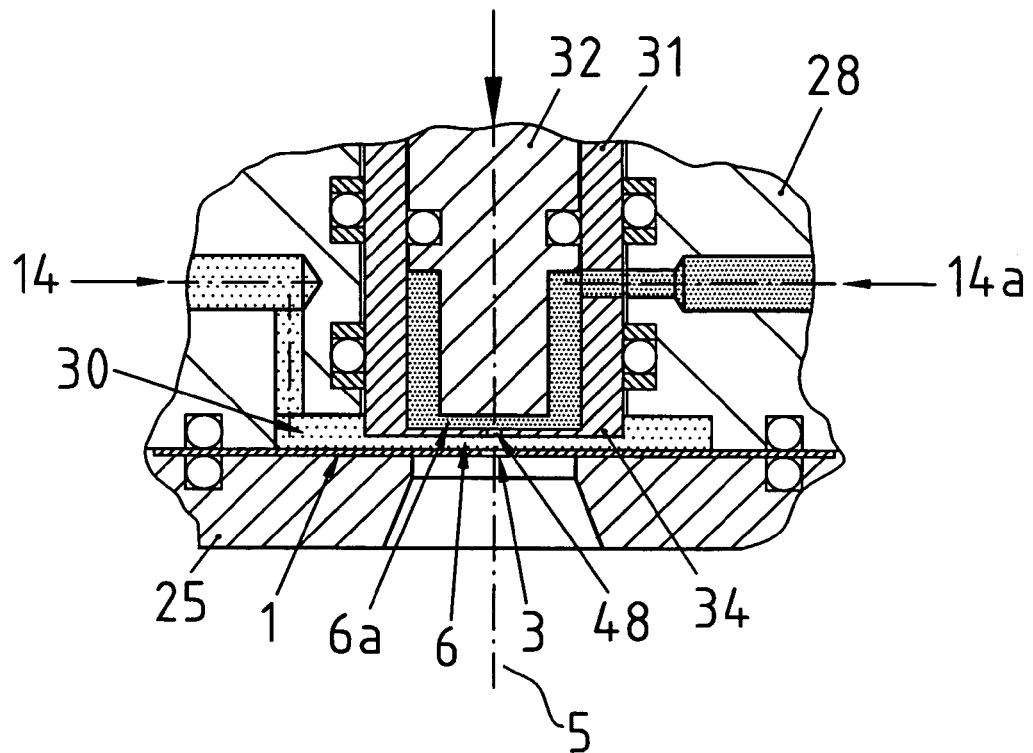
Fig.8.1
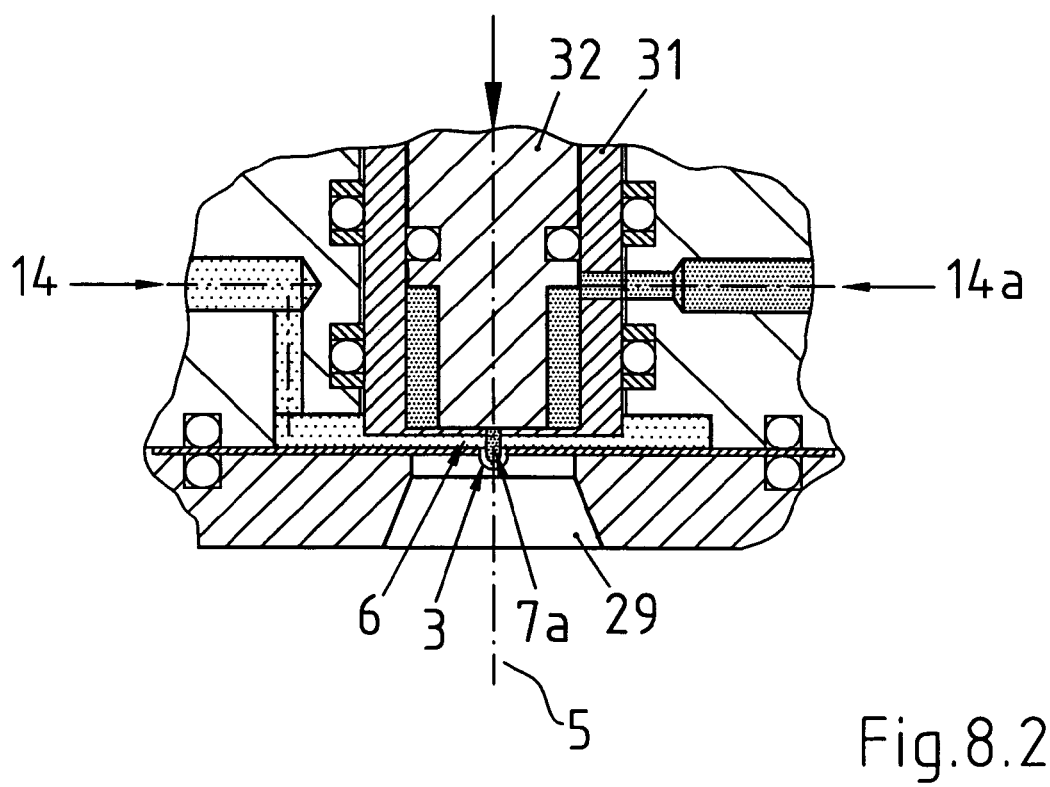
Fig.8.2

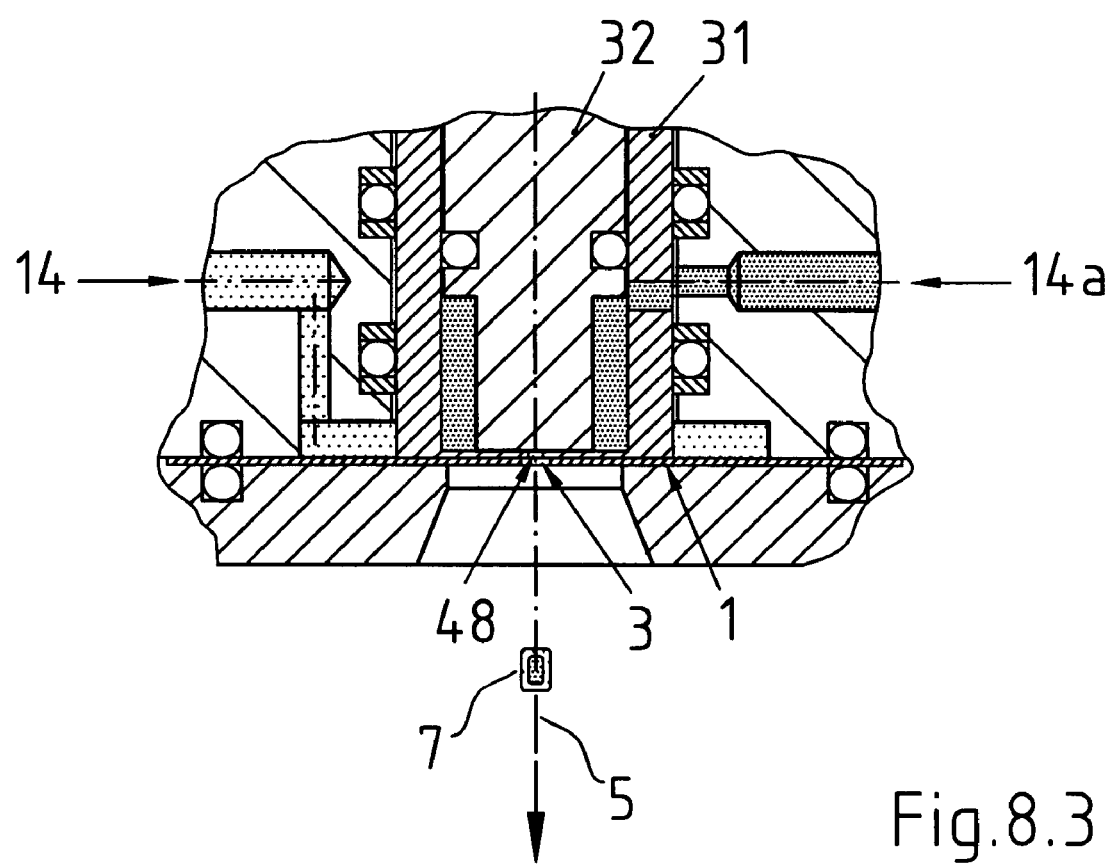
Fig. 8.3

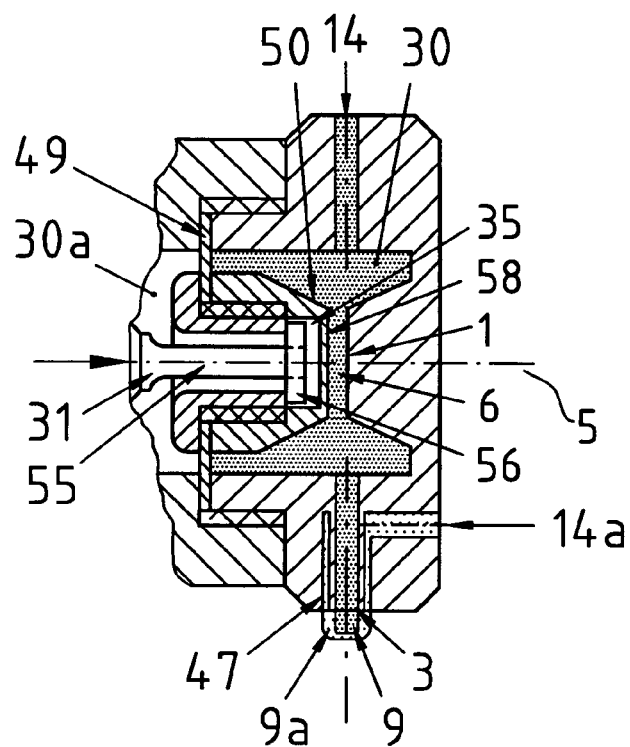
Fig.10.1
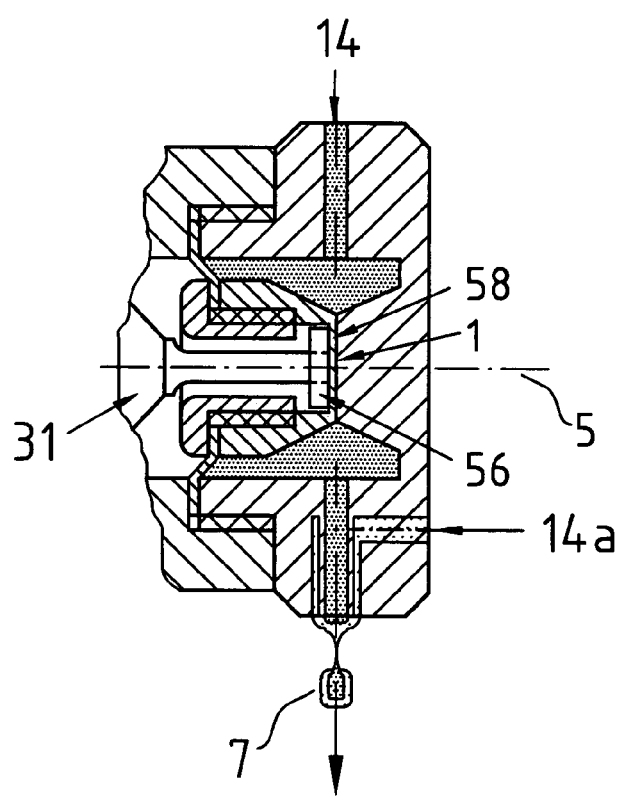
Fig.10.2

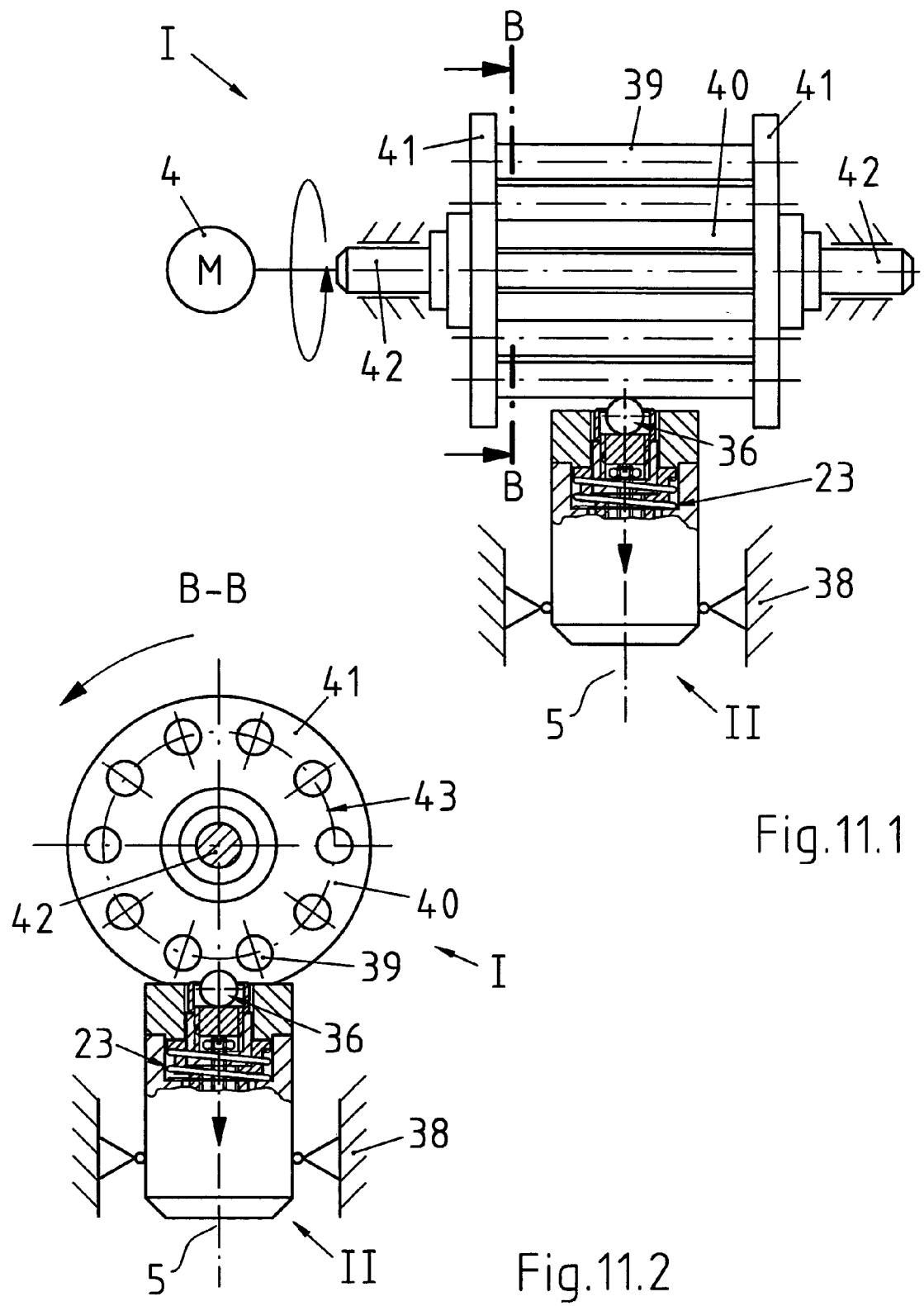

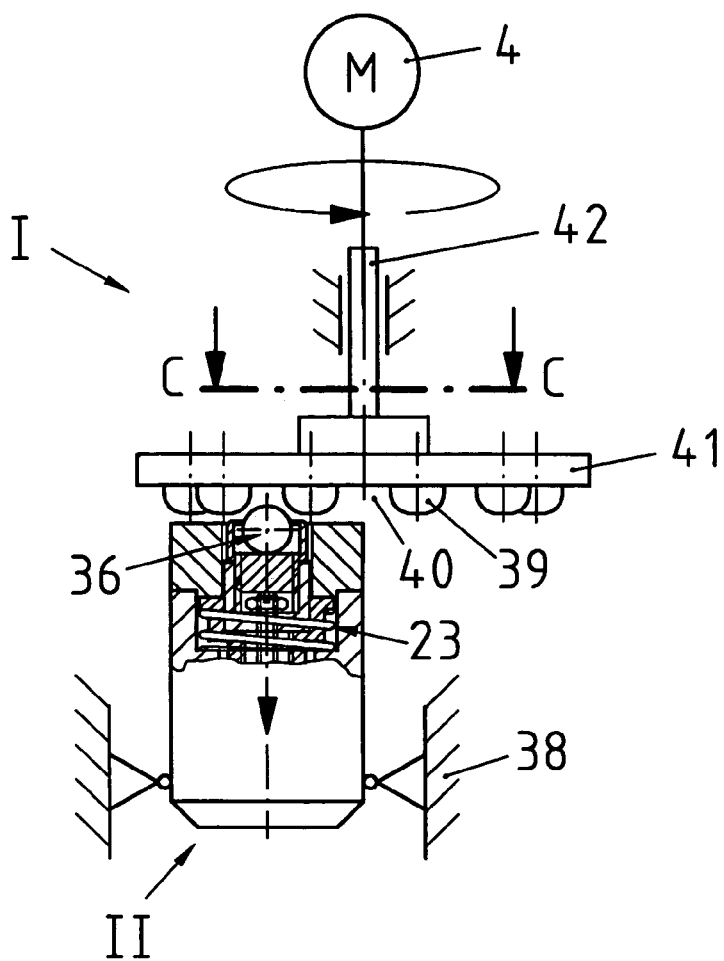
Fig. 12.1
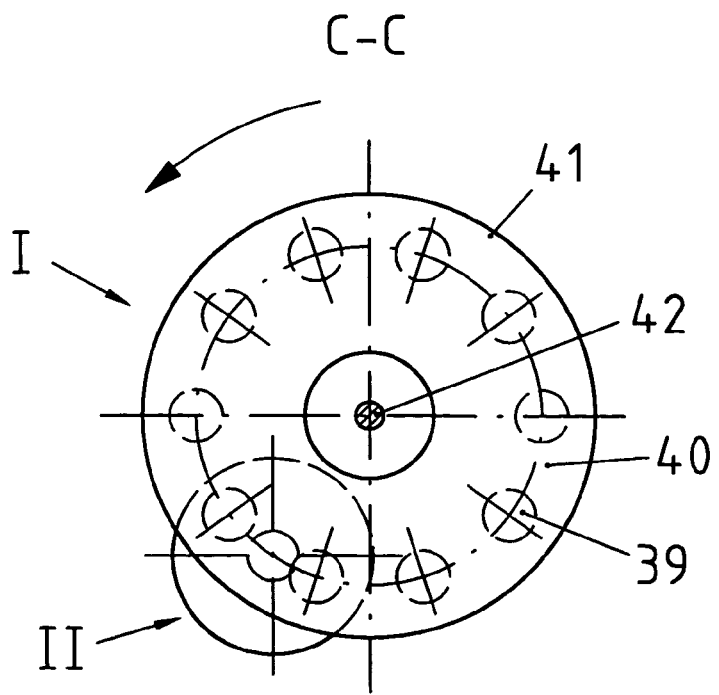
Fig. 12.2

METHOD AND DEVICE FOR THE PRODUCTION OF PARTICLES FROM LIQUID STARTING MATERIALS

BACKGROUND

1. Technical Field

The present invention relates to a method for the production of solidified particles from a liquid raw material, wherein individual liquid volumes are separated from the liquid raw material on a portion-by-portion basis and these portioned liquid volumes are introduced into an environment which is effective to solidify the individual particles, and it also relates to devices used for this purpose.

2. Related Art

Solid particles or micro-particles produced from liquid media can be used in the fields of medicine, pharmaceuticals, biotechnology, agro-chemistry, as well as in the food and chemical industries. Thus, for this purpose, selected active substances can be introduced into a carrier medium which, initially, is in the liquid state. In a subsequent processing step, the carrier medium together with the active substance is portioned in the form of liquid precursor droplets and fed into an environment which is effective to solidify the liquid precursor droplets. The active substances, which are now present in the form of solidified and structurally hardened particles, exhibit advantageous chemical, biological and/or physical properties in dependence on the type of active substance as well as on the shape, size and distribution of the micro-particles.

Carrier media for the production of solid particles by means of a process involving the solidification of liquid precursor droplets are known. Hereby, these may, for example, be monomer and polymer liquids, ionic cross-linked gels (sodium alginate for example), thermally cross-linked gels (agar agar for example), gelatine, metallic oxides, hydroxyl cellulose, polyvinyl alcohol, waxes, resins, melts, etc.

Media for the solidification of such carrier media are likewise generally known. Thus, the solidification or gelling of sodium alginate can take place in the presence of potassium or calcium ions which are present in a so-called cross-linking solution in a catching bath.

Devices are also known wherein the liquid used for the production of the solid particles is fed-in in the form of a jet through appropriately designed nozzles and the fluid jet is divided up or atomised into individual separate drops immediately after flowing through the nozzle body.

A device, in which the dividing process takes place by means of a vibratory action, is known from DE 2 221 310 C2. The division into drops is effected by means of a nozzle arrangement connected to a vibratory drive. The drops are collected and solidified in a downstream reaction vessel.

A device for the production of spherical granulates by vibratory or oscillatory stimulation is described in DE 196 17 924 A1. The formation of the individual drops is obtained by directly stimulating the liquid that is to be turned into drops by means of an oscillatory process. Here, the transmission of the oscillation to the liquid is effected by means of a resilient body which has been caused to oscillate or by the introduction of a piezo-electric crystal or an ultrasonic probe.

In DE 34 17 899 C1 for example, it is described how liquids can be atomised with the aid of a rotating cylinder having openings formed in the cylinder wall. Drops are hurled into an cross-linking solution through the appropriate openings. The cross-linking solution is located in a container that is likewise mounted in rotary manner around the cylinder and, due to the rotation, forms a parabolic fluid mirror via which the droplets being spun out from the cylinder wall enter the cross-linking solution for the hardening process.

A device is known from DE 44 24 998 C2, wherein a full jet of fluid initially emerges under pressure from a nozzle and is divided up into individual sections in a subsequent step by means of a divider device. The formation of the liquid sections is effected in that liquid portions are periodically expelled from the fluid jet by means of the divider device thereby forming drop-shaped elements. Only that part which remains in the jet reaches the solidification process, the expelled portion representing a cutting or spraying loss.

Other devices for the production and portioned discharge of small drops are known from ink jet printer technology. Here, the discharge of the ink droplets is caused by inducing a displacement of the liquid. This displacement may be effected piezo-electrically by the deformation of a body, thermoelectrically by the production of a vapour bubble (WO 96/32242 for example), by the production of an acoustic pressure wave or electro-dynamically by the rotary movement of a paddle in a magnetic field (U.S. Pat. No. 4,150,201 for example).

In the conventional processes, the viscosity of the starting liquids represents a limiting factor for each of these methods, so that either only low viscosity liquids or only high viscosity liquids can be processed. Furthermore, the production of droplets having a mono-dispersed size distribution is a problem due to the unpredictable variation in the way the individual droplets coalesce into a larger droplet. In addition, the production of droplets having a centred core and a cladding liquid is only possible to a limited extent, or is not possible at all. Moreover, it is desirable to increase the scale of production such as the throughput quantities as well as to prevent losses of the starting medium caused by the techniques being used.

SUMMARY

Consequently, the general object of the present invention is to improve the reliability and the area of application of methods and devices used for the production of solid particles from liquid media.

In particular, the object of the invention was to make available methods and the devices therefor which exhibit the following advantageous properties:

production of micro-particles within a broad range of sizes, in particular for example, within the range of 6 mm to 150 µm and smaller, production of micro-particles having a mono-dispersed size distribution, production of multi-layered particles, workability of liquid starting media having the most different of material properties, of low and high viscosity liquids, and in particular, in the viscosity ranges of more than 500 mPas and less than 200 mPas, liquids having solid components as well as high temperature melts, no clogging of the nozzles even with the smallest of nozzle diameters, simple adaptation of the amount of mechanical energy supplied to the material properties of the starting medium by virtue of the strength of the impact force, high production rates, in particular by the production of impulsive forces (mechanical impulses) at a high frequency of up to 12,000 Hz, and loss-free production of the micro-particles without producing clouds of spray In accordance with the invention, this object is achieved by a method according to which liquid droplets of a starting medium are introduced on a portion-by-portion basis into an environment which effects the solidification process thereby resulting in the formation of solid particles, wherein, a liquid film is formed from the liquid starting medium between an impact screen and an impact mass over at least one opening, a mechanical impulse is transmitted to the liquid film and, due to the transmission of the impulse, a part of the liquid film as well as the capillary liquid, which has formed in the at least one opening, is discharged through the at least one opening in the form of a liquid droplet.

Furthermore, in accordance with the invention, there is made available a device for the production of solid particles from a liquid medium which comprises a micro-particle extruder incorporating at least one impact device which comprises at least one impact screen, an impact mass, and at least one opening wherein either the impact screen or the impact mass is implemented in the form of a moveable actuator for the transmission of a mechanical impulse, and the respectively corresponding impact mass or impact screen forms a fixed counter-body, and means for the formation of a liquid film on the surface of the at least one impact screen.

Alternatively, both the impact screen and the impact mass can be implemented in a moveable manner in the form of actuators, whereby both are moved against one another for the purposes of transmitting an impulse.

In accordance with a further aspect, the invention relates to a device of the type comprising an impact drive incorporating impact elements, a micro-particle extruder incorporating an impact receiver for the reception and transmission of the impulse produced by the impact elements, at least one adjusting device for resetting the impact receiver into its initial position as well as at least one impact device.

In accordance with a further aspect, the invention relates to a device which causes the discharged liquid droplets to follow a spiral flight path and comprises a hollow cylinder that is adapted to be set in motion about its longitudinal axis and is provided with a slip-ring which is fixed on the outer casing surface of the cylinder and an electrode which is fixed on the internal casing surface thereof, the electrode being connected to the slip-ring by means of a connecting line, a contact brush which rests loosely upon the slip-ring and is connectable to a high voltage generator, and also a grounding wire, whereby the hollow cylinder is open in the direction of entry of the droplets.

In accordance with a further aspect, the invention relates to a device which causes the discharged liquid droplets to follow a spiral flight path and incorporates two or more slip-rings and/or two or more electrodes.

In the sense of the present invention, a constructional component, on which a liquid film is formed for the separation of the liquid droplets, is effective as an impact screen.

An impact mass is the counterpart of the impact screen, whereby the impact mass and/or the impact screen strike one another or approach one another for the purposes of transmitting an impact.

A constructional component, which transmits an impact to the liquid film and is implemented in moveable manner, is referred to as an actuator.

For the purposes of the present invention, either the impact screen or the impact mass is implemented in the form of a moveable actuator, whilst the respectively corresponding impact mass or impact screen forms a fixed counter-body.

Alternatively, both the impact screen and the impact mass could be implemented such as to be moveable.

A constructional component of the device to which the drive transmits the impulse directly, i.e. that particular component which receives the impulse from the drive and passes it on, is referred to as an impact receiver.

In the case of the method in accordance with the invention, the cleavage of a previously formed liquid film is effected by applying a mechanical impulse (also referred to hereinafter as an "impact") to the surface of a liquid film so that such a brief application of a large force is effective to cause defined liquid volumes to be stripped off in the form of liquid droplets.

In contrast thereto, the liquid is fed through appropriately designed nozzles in the conventional methods. Hereby, the process of splitting it up into individual elements and/or droplets is effected either immediately after it has flowed through the nozzle body, or, the liquid medium, which is present in the form of a fluid jet, disintegrates under appropriate conditions either automatically or by virtue of forced external influences, or, the liquid is portioned by means of an induced displacement of the fluid which is produced piezo-electrically, thermoelectrically, in an acoustic pressure wave or electro-dynamically. In the case of the conventional methods, the liquid particles move exclusive along straight paths.

In the method in accordance with the invention, a mechanical impulse, i.e. an impact, is transmitted to a constructional component implemented in the form of an actuator. The quantity of mechanical energy i.e. the impact force is passed on by virtue of the actuator striking or approaching a counter-body at high speed whilst moving linearly along the impact-normal.

A liquid film is formed on the impact screen and thus between the actuator and the counter-body, whereby part of the liquid film comes to rest in the at least one opening in the form of a capillary liquid.

When the actuator and the counter-body approach or strike one another, the actuator transmits an impact to the fixed counter-body and, at the same time, to the liquid film and the capillary liquid present within the opening. The capillary liquid and also a portion of the liquid film located above it thereby experience an acceleration and are discharged from the opening as droplets.

Hereby, the size, shape and the number of droplets that are formed depend essentially on the thickness of the liquid film and the capillary liquid, i.e. on the size and number of openings and the relationship between the impact frequency and the speed of the flowing liquid as well as on the nature of the path of movement and the duration of the dwell-time experienced by the droplets before reaching the solidification medium.

In accordance with the invention, it is particularly preferred that the transmission of the impact produced by the actuator on the counter-body should take place in a straight line and, in particular, centrally. In the sense of the invention, the term "straight-line impact" means that the actuator is moved linearly along the impact-normal, the impact-normal extending perpendicularly relative to the surface of the liquid film.

For the transmission of a straight-line and in particular of a central impact, it is of advantage, if the manner in which the actuator and the counter-body approach one another is effected solely by virtue of the movement, and not by virtue of a deformation or a buckling action, of the actuator or the counter-body.

If the actuator, the counter-body and the liquid film strike one another along a straight line, they will not slide on top of one another so that frictional forces will not occur on the surfaces of the members. Thus, only the straight-line impact forces directed along the impact-normal will be effective on the actuator, the counter-body and the liquid film. In addition, since the impact preferably takes place centrally, the impact forces pass through the centre of gravity of the body i.e. through the centre points of the actuator and the counter-body so that rotational motion will not be induced in the droplets.

The impact force being transmitted can be increased still more by virtue of the impact being directed along a straight line since the impact is effective uniformly on the liquid film and a liquid wedge of varying thickness, one which is thicker at one side than it is at the other, will not be produced between the actuator and the counter-body.

In addition, by virtue of this measure, the volume of the discharged liquid and thus the size of the droplets being formed will remain homogeneous.

By contrast, if the liquid droplets are caused to self-rotate, they may become deformed due to the effective centrifugal forces so that the shape of the resulting solid particles will be irregular. Due to the centrifugal forces, small portions of liquid might separate from the liquid droplets with the consequence that the size of the resulting particles would vary in an unpredictable manner and corresponding losses of the starting medium would have to be accepted.

In accordance with the invention, it is particularly preferred that, after leaving the device and before reaching the solidification medium, the further movement of the liquid droplets that are generally present in the form of an aqueous solution should take place along a spiral path.

The spiral path may be produced by a rotating electrostatic field for example.

The advantage of having the droplets move along a spiral path before reaching the solidification medium is that this will prevent the individual droplets from striking one another and will thus favour the formation of a mono-dispersed distribution of the particle sizes. Furthermore, there will be an increase in the dwell-time experienced by the droplets before reaching the solidification medium and this will therefore result in an improvement in the formation of the preferably desired spherical shape of the micro-particles.

The method in accordance with the invention can be carried out with the aid of a device comprising a micro-particle extruder containing at least one impact device, at least one impact screen, at least one opening, an impact mass, whereby either the impact screen or the impact mass is designed in the form of a moved actuator so that, in operation, the actuator will apply an impact to the counter-body i.e. the corresponding impact mass or impact screen appertaining thereto, and means for forming a liquid film on the impact screen.

In operation, an impact or a mechanical impulse is transmitted to the actuator and the counter-body of the impact device at periodic intervals by means of an impact drive.

At the same time, a liquid film is formed on the impact screen and thus between the actuator and the counter-body whereby a portion of the liquid will come to rest in the at least one opening in the form of a so-called capillary liquid.

The actuator is moved in a linear manner along the impact-normal towards the liquid film, and transmits a preferably straight-line, and in particular, central impact to the counter-body as well as to the capillary liquid present within the at least one opening.

For the purposes of transmitting an impact, the impact drive may comprise one or more impact elements. The micro-particle extruder can be provided with an impact receiver for receiving the impact, the receiver passing the impact on to the actuator, or, the actuator may itself function as an impact receiver if the impact is applied directly to the actuator.

One or more adjusting devices may be provided in the micro-particle extruder for the purposes of resetting the impact receiver and the actuator into the initial position thereof prior to the impact.

A high voltage device may be provided in the direction of motion of the discharged liquid micro-particles, whereby the liquid micro-particles will be guided along a spiral path in a rotating electrostatic field during their passage through the high voltage device.

This is followed in the direction of motion of the liquid micro-particles by a suitable solidification medium or an appropriate environment so that the liquid micro-particles will then be solidified when entering the solidification medium or by virtue of their passage through this environment.

The liquid film formed in the impact device in accordance with the invention preferably exhibits a uniform thickness, it also being preferable that the thickness of the film be uniform not just during the formation of an individual droplet, but each of the liquid films that is periodically formed by the flowing starting medium should also exhibit the same uniform thickness during the entire duration of the method. Thus, in the sense of the invention, the term “uniform liquid film” means that the liquid film that is formed and affected by the actuator on each occasion is always of the same thickness.

This measure promotes the formation of uniform large droplets having a narrow distribution of droplet sizes since a portion of the liquid film located above the capillary liquid will also be discharged together therewith during the transmission of an impact. In the ideal case, the length of the liquid droplet will thereby correspond to the thickness of the film.

In addition, the provision of a uniform liquid film has the effect that the transmission of the impact or impulse to the liquid film will also be uniform so that the lateral component of the flowing liquid remains the same and a homogeneous discharge of the particles is thereby obtained.

Consequently, in the device in accordance with the invention, there is preferably provided a boundary means which demarcates the surface of the liquid film and thus limits its thickness. This boundary means can be obtained by forming an air chamber above the liquid film or it could be produced by structural measures such as by the provision of a solid boundary means.

In accordance with the invention, it is additionally preferred that the acceleration of the actuator should take place substantially or entirely outside the liquid film, this being referred to hereinafter as “decoupling”.

The acceleration of the actuator can thus take place in a medium which has a smaller resistance than the liquid film, such as for example, in a gaseous medium, in particular, air.

A greater acceleration and thus a larger force can be produced by virtue of the smaller amount of friction. In addition, this will prevent turbulence of the liquid film and the consequential formation of an irregular film thickness which would arise during acceleration of the actuator in the liquid.

The decoupling effect can be produced by the same means as were mentioned hereinabove for bounding the liquid film and this will be explained hereinafter with the aid of the preferred embodiments.

By virtue of the method in accordance with the invention, it is possible to produce extraordinarily high impact forces due to the very short period in which the impact process is adapted to take place. Thus, apart from the processing of liquids of low viscosity, it also becomes possible with the method in accordance with the invention to process highly viscous liquids or liquids having solid components due to the very high impact forces that can be set up. In addition, the method in accordance with the invention makes it possible to process systems incorporating two or even a multiplicity of materials. Moreover, the high impact forces and simultaneously, a possibly high impact frequency result in a very high throughput even in the case of a mono-dispersed distribution of the droplet sizes whilst still providing loss-free processing conditions, this being assisted and enhanced still more by the preferred movement of the droplets along a spiral path thereby ensuring the suitability of the method in accordance with the invention for employment in a production environment.

At the same time, the high impact forces prevent clogging of the outlet openings and/or deflection of the droplet beam by solidifying liquid components or solid components.

The supply of the liquid starting medium for the production of the micro-particles can be effected through any suitable form of supply line via which the starting medium is fed into the impact device for the formation of a liquid film.

An adjustment to the speed of the stream of starting medium entering the impact device can be effected by means of the application of pressure for example.

The method in accordance with the invention and the devices in accordance with the invention will be explained in greater detail hereinafter with the aid of the Figures showing the basic principles thereof and the preferred concrete constructional exemplary embodiments which are shown in the form of longitudinal sections. Here, the Figures merely serve for better illustrating the present invention without thereby restricting the invention to the particularly preferred concrete embodiments that are shown.

BRIEF DESCRIPTION OF THE DRAWINGS

Here, the Figures show:

FIG. 7.1 the exemplary embodiment of FIG. 7 at the time point for the formation of a liquid film;

FIG. 7.2 the exemplary embodiment of FIG. 7 at the time point for the formation of a liquid micro-particle when set for high viscosity liquids;

FIG. 7.3 the exemplary embodiment of FIG. 7 at the time point for the formation of a liquid micro-particle; when set for low viscosity liquids;

FIG. 8.1 the exemplary embodiment of FIG. 8 at the time point for the formation of a multi-component liquid film;

FIG. 8.2 the exemplary embodiment of FIG. 8 at the time point for the formation of a centered core liquid; and FIG. 8.3 the exemplary embodiment of FIG. 8 at the time point for the formation of a micro-particle consisting of a core and cladding liquid;

FIG. 10.1 the exemplary embodiment of FIG. 10 at the time point for the formation of a centered core liquid;

FIG. 10.2 the exemplary embodiment of FIG. 10 at the time point for the formation of a micro-particle consisting of a core and cladding liquid, when set for high viscosity liquids;

FIGS. 11.1 to 11.2 an exemplary embodiment of an impact device in accordance with the invention for the production of high frequency impulses;

FIGS. 12.1 to 12.2 a second exemplary embodiment of an impact device in accordance with the invention for the production of high frequency impulses;

DESCRIPTION OF THE PREFERRED EMBODIMENTS

Figure 1:
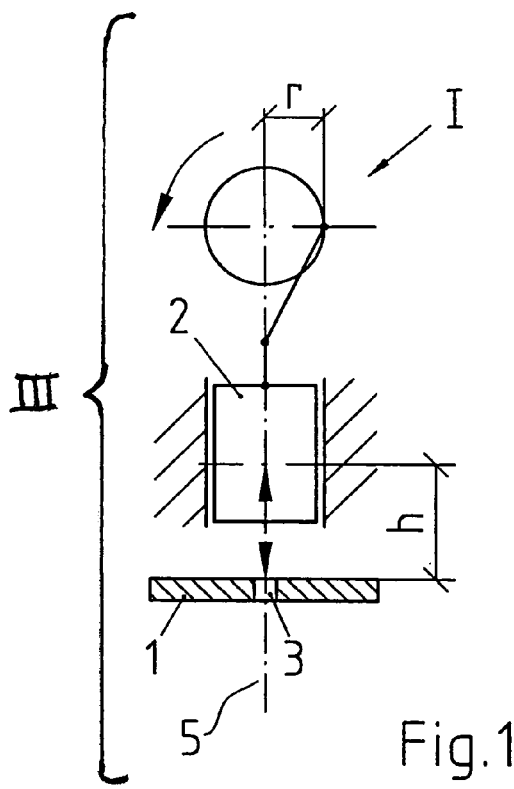
FIG. 1 a drawing depicting the principle of a push-type impact transmission arrangement.

In accordance with the invention, the impact of the actuator against a fixed counter-body can be brought about by moving the actuator down onto the counter-body from above using a push-type action or by moving it up against the counter-body from below using a pull-type action as is schematically illustrated in FIGS. 1 to 6. The counter-body can be fixed as shown here, or could likewise be implemented such as to be moveable.

In FIGS. 1 to 6, there are shown impact devices III which comprise an impact screen 1, an impact mass 2, and also an opening 3 in the impact screen, and, an impact drive I. In operation, a liquid film 6 (FIG. 7.1) is present on the impact screen 1 and thus between the actuator and the counter-body and, in consequence, capillary liquid, which is not shown here, is present in the opening 3.

The principle of a push-type impact device is shown in FIGS. 1, 2, 5 and 6, whereby the impact mass 2, which is in the form of a moveable actuator, is moved linearly along an impact-normal 5 from above against the impact screen 1 forming a fixed counter-body. When the impact mass 2 strikes the impact screen 1, or during its approach thereto, a straight-line impact is transmitted to the screen and thus to the liquid film, whereby the capillary liquid will emerge from the opening 3 in the form of liquid micro-particles.

As mentioned above, the portion of the liquid film 6 that is present above the opening 3 will also be discharged together with the capillary liquid.

Figure 3:
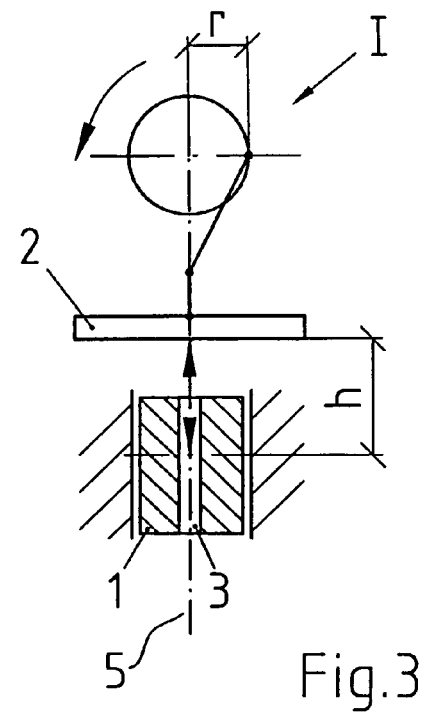
FIG. 3 a drawing depicting the principle of a pull-type impact transmission arrangement.
Figure 4:
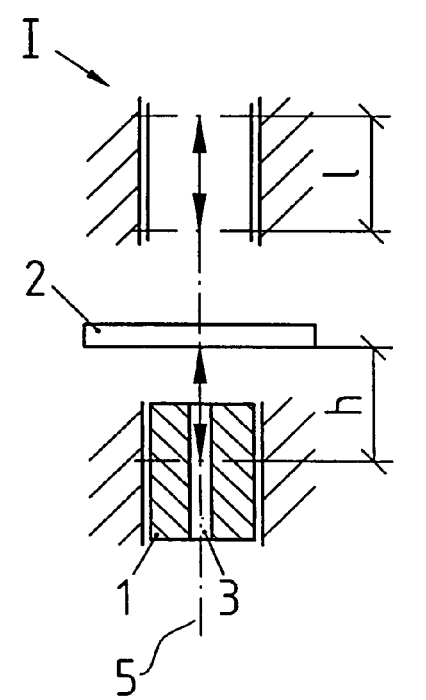
FIG. 4 a second drawing depicting the principle of a pull-type impact transmission arrangement.

The principle of a pull-type impact device is shown in FIGS. 3 and 4. Here, the impact screen 1 functions as an actuator which is moved or pulled up from below against an impact mass 2 acting as a counter-body.

The impact force needed to create an impact can be produced by any type of impact drive I. For example, a rotary motion can be converted into a linear impact movement, as illustrated in FIGS. 1, 3 and 5.

Figure 2:
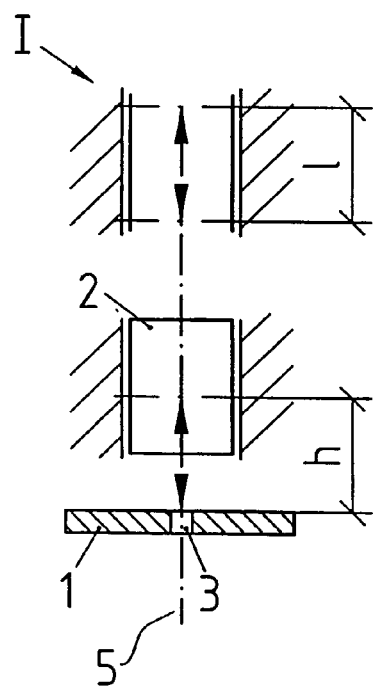
FIG. 2 a second drawing depicting the principle of a push-type impact transmission arrangement.
Figure 6:
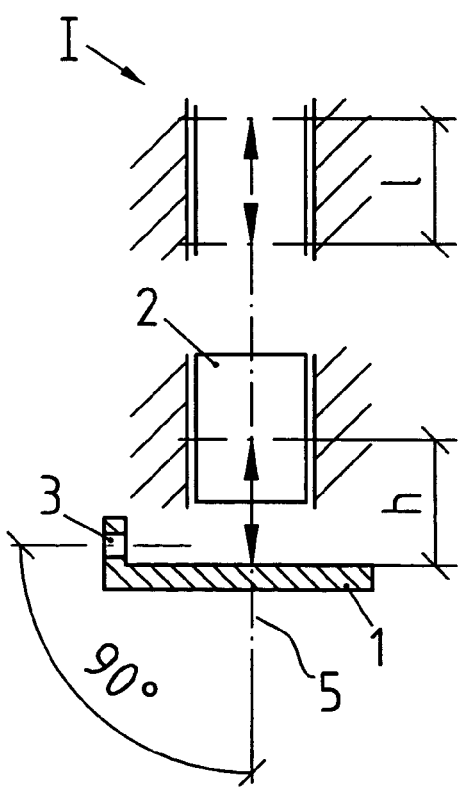
FIG. 6 a second drawing depicting the principle of a push-type or pull-type impact transmission arrangement wherein the discharge of the droplets occurs perpendicularly to the impact-normal.

As shown in FIGS. 2, 4 and 6, the necessary impact force could also be produced by the direct transmission of a linear impact movement.

A piston or the like can be selected as an actuator. Examples for the drives are electrical and pneumatic drives. A plurality of openings as well as of constructional components acting as impact screens may be provided in dependence upon the need and the particular form of embodiment.

Figure 5:
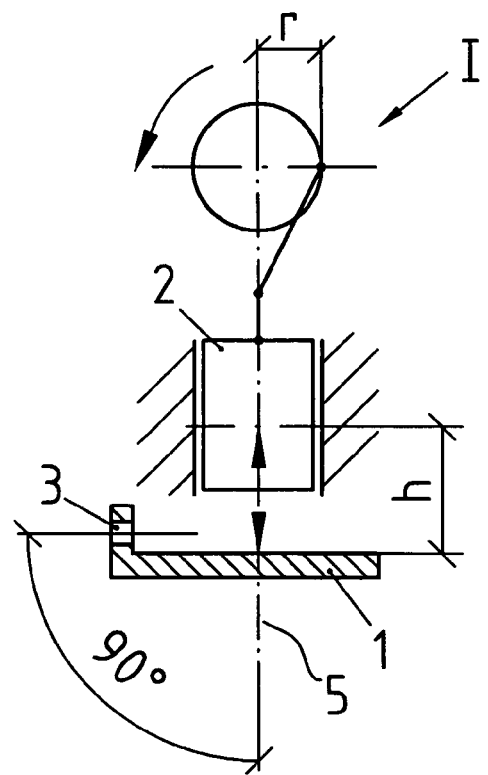
FIG. 5 a drawing depicting the principle of a push-type or pull-type impact transmission arrangement wherein the discharge of the droplets occurs perpendicularly to the impact-normal.

As illustrated in FIGS. 1 to 4, the opening 3 can be arranged centrally with respect to the direction of the impact-normal 5, or it could also be positioned at an angle of 90° relative to the impact-normal 5, as illustrated in FIGS. 5 and 6. However, the positioning of the opening 3 could also be effected at any other arbitrary angle.

In the device in accordance with the invention, the adjustment or change of the impact force can easily be effected by varying the actuator stroke h i.e. the maximum distance between the frontal surfaces of the actuator and the counter-body.

Generally, the actuator stroke h, and thus the impact force exerted, is varied by means of the lever arm r or the stroke 1. Different cases in regard to the nearness of approach of the actuator and the counter-body and thus in regard to the size of the transmitted impact or impetus can be distinguished in dependence on the relationship selected for the actuator stroke h relative to the lever arm r or for the maximum stroke of a linear stroke 1. Thus, the actuator and the counter-body will briefly make contact in the case where h=2×r or h=1; if h is <2×r or h<1, then the actuator and the counter-body will strike each other. This setting is particularly advantageous for high viscosity liquids.

In this case, a compensating element, such as a shock absorber for example, can be provided for the actuator and/or the counter-body.

If h is >2×r or h>1, then the actuator and the counter-body will not touch one another and a uniform gap will be left between the actuator and the counter-body. The transmission of the impact or impulse takes place here merely by virtue of them approaching one another. This setting is suitable for low viscosity media because the force transmitted in this case is generally smaller.

The amount of mechanical energy needed for the formation of the particles can easily be adapted to the particular requirements by the variation of the actuator stroke or of the impact force that is made possible by virtue of the invention. The requisite amount of mechanical energy can, for example, be derived from the material properties of the starting medium such as the viscosity, the surface tension, the density, or, for example, from that discharge velocity of the liquid droplets which is desirable in order to prevent them bursting apart when striking the surface of the solidification medium V (FIG. 13) or to eliminate clogging of the outlet opening.

A further possibility for influencing the impact force is provided by changing the impingement surface of the actuator, i.e. the surface area of the actuator which is effective on the counter-body or the liquid film. Thus, the impact force, which is transmitted punctually to the counter-body, can be increased by making the impingement surface of the actuator smaller. The reverse applies in regard to a decrease in the impact force.

An exemplary embodiment of a device in accordance with the invention incorporating a micro-particle extruder II having a push-type impact device III for the production of single layer micro-particles is illustrated in FIG. 7. The impact drive I in this embodiment is effected in push-type manner by converting a rotary motion into a linear motion as is shown in FIG. 1.

The impact drive I (FIGS. 7 and 8) comprises a motor (not shown) which is connected to an eccentric shaft 19, an eccentric cam crank 20, and an impact element 21, which is implemented in the form of a guide piston here.

Herein, the eccentric shaft 19 transmits the torque produced by the motor via the eccentric cam crank 20 to the impact element 21, which is arranged in a drive housing 22 such as to be linearly moveable therein. The impact element 21 moves up and down within the housing of the drive at a fast rate and, with each downward movement, it strikes against a likewise movable drive piston 32 which simultaneously functions here as an impact receiver and thereby produces a straight-line impact along the impact-normal 5.

In the embodiment of FIG. 7, the impact mass 2 forms the moveable actuator and the screen 1 serves as a fixed counter-body. The impact mass 2 is composed of a cylindrical percussion piston 31 into which the drive piston 32 is inserted. The drive piston 32 is arranged within the percussion piston 31 such as to be freely moveable therein. The percussion piston 31 itself is movable within an extruder housing 28 via a seal 33, for example.

The percussion piston 31 is held at a certain height above the screen 1 by means of an adjusting device 23 which is a compression spring here.

Furthermore, the device comprises a mounting plate 25, with the aid of which the screen 1 is clamped to the extruder housing 28, preferably between two seals (26, 27). In correspondence with the opening 3 in the screen 1, the mounting plate 25 likewise comprises an opening 29 which, here, is conical in shape and also here, is wider than the opening 3.

As shown here, the device may be equipped with a plurality of supply lines 14 for the starting medium. In the device shown, there is a respective supply line 14 at opposite sides of the device.

The liquid film 6 is formed between the base plate of the piston 31 and the screen 1, whereby the base plate limits the thickness of the liquid film 6.

In general terms, the course followed by the method in accordance with the embodiment shown in FIG. 7 can be described by three phases: The first phase is that for the formation of a liquid film 6 in the case where the percussion piston 31 and the drive piston 32 are raised, the second phase is the one in which a straight-line impact is transmitted from the drive piston 32 to the percussion piston 31 by virtue of the drive piston 32 making an impact on the base plate of the percussion piston 31 from above, and the third phase is that wherein the percussion piston 31 transmits the impact to the liquid film 6 and also to the screen 1 whereby the capillary liquid will be discharged from the opening 3 in the form of liquid droplets 7 (FIG. 7.2).

All three phases are gone through repeatedly in dependence on the frequency of movement of the drive piston 32 and the flow speed of the starting medium through the supply lines 14, this thus resulting in the periodic discharge of a dosed portion of liquid micro-particles 7.

Figure 7:
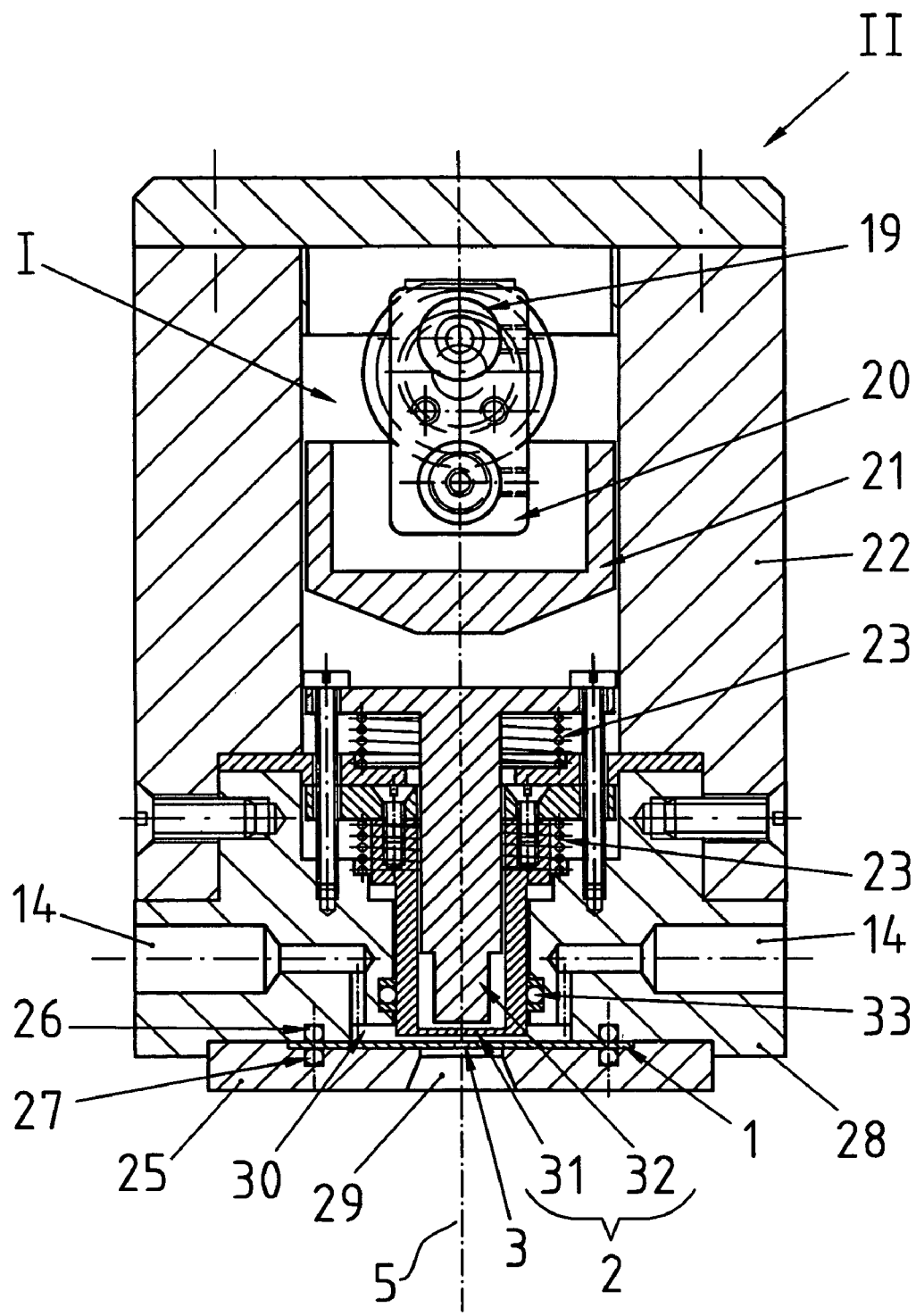
FIG. 7 an exemplary embodiment of a device in accordance with the invention utilising a push-type impact device.

The operational principle of this exemplary embodiment of FIG. 7 is schematically illustrated in FIGS. 7.1 to 7.3.

In FIG. 7.1, the device of FIG. 7 is shown in the first phase with a raised percussion piston 31 and drive piston 32.

It is in this phase that the formation of the liquid film 6 takes place. To this end, a liquid starting medium is fed into a dosing chamber 30 of the extruder II via a supply line 14.

The percussion piston 31 plunges into the liquid and thus delimits the liquid film 6. By virtue of this special structural measure for defining the boundary, it can, on the one hand, be ensured that a uniform liquid film 6 will always be formed by the flowing starting medium on each occasion.

At the same time, the piston 31 produces the effect of decoupling the drive piston 32 from the liquid film 6 since the drive piston 32 moves exclusively in an air chamber 35 which is formed within the piston 31 when the drive piston 32 is raised.

The conditions existing immediately after the transmission of the impact forces to the impact screen 1 as well as to the capillary liquid in the opening 3 are illustrated in FIGS. 7.2 and 7.3.

With reference to FIG. 1, the nearness of approach of the percussion piston 31 with respect to the impact screen 1 can be adjusted in dependence on the material properties of the starting medium.

In FIG. 7.2, the percussion piston 31 and the impact screen 1 touch one another for a short period. This setting can be advantageous for high viscosity starting media in particular.

In FIG. 7.3, the percussion piston 31 and the impact screen 1 do not touch one another and a uniform liquid film 6c remains therebetween. This setting is advantageous for low viscosity starting media for example.

The impact forces produced by the acceleration of the drive piston 32 and the subsequent impact are transmitted by the percussion piston 31 to the screen 1 acting as a counter-body and thus, at the same time, to the capillary liquid present within the opening 3. In this phase, the percussion piston 31 and the drive piston 32 are connected to one another. The capillary liquid is separated from the liquid film 6 as a separate liquid micro-particle 7 and here, it is accelerated along the impact-normal 5 in order to subsequently become a solidified micro-particle 8 in a solidification environment (V).

Figure 8:
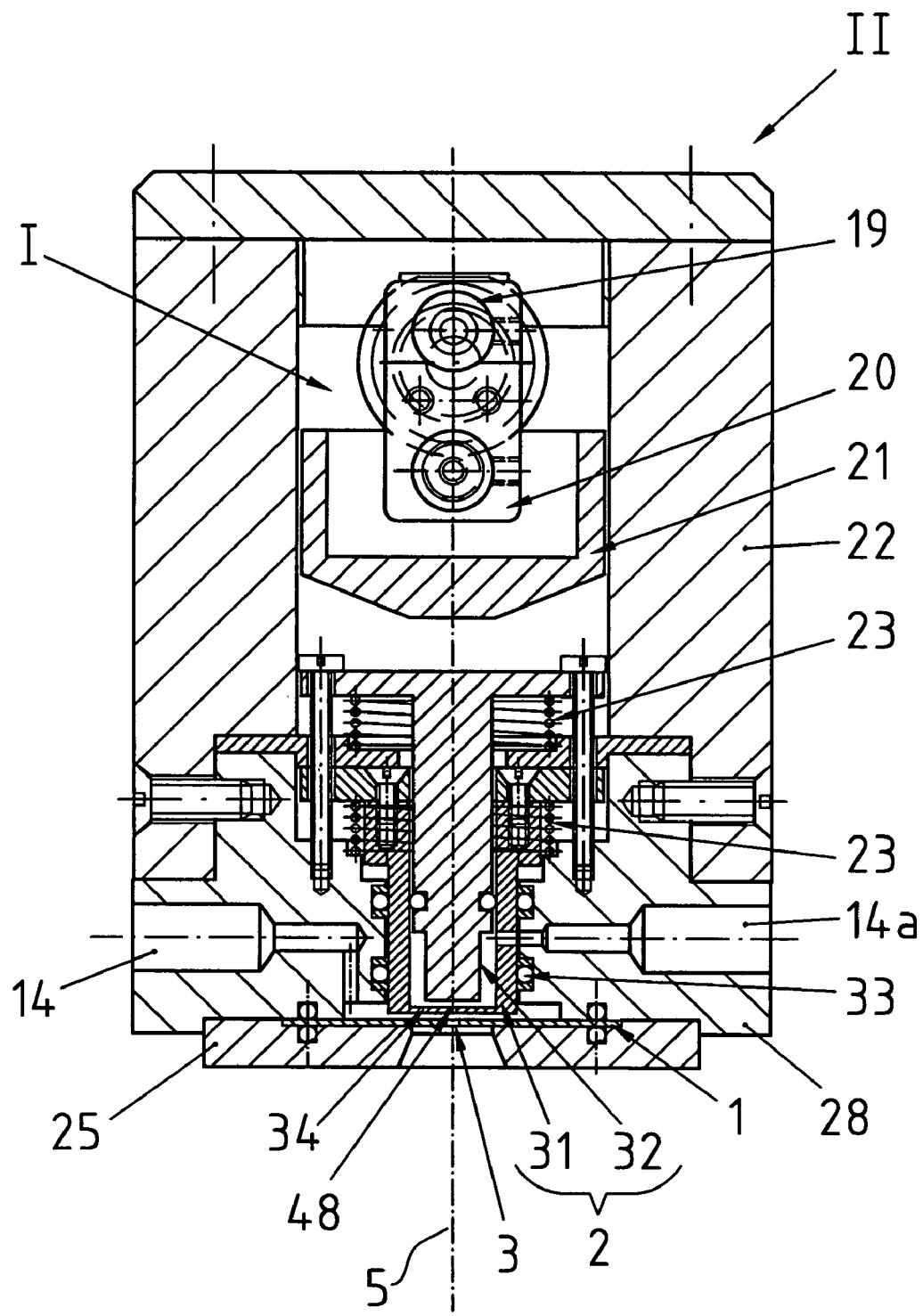
FIG. 8 an exemplary embodiment of a device in accordance with the invention utilising a push-type impact device for the production of multi-layer particles.

A further embodiment of a micro-particle extruder II in accordance with the invention incorporating a push-type impact device III for the production of two-layered micro-particles is illustrated in FIG. 8. The impact drive I in this embodiment is effected in push-type manner in accordance with the illustration shown in FIG. 1. The operational principle of this embodiment is depicted in FIGS. 8.1, 8.2 and 8.3.

The micro-particle extruder shown in FIG. 8 can be obtained by means of a slight modification to the micro-particle extruder for single-layer micro-particles that is shown in FIG. 7, in that supply lines 14a for a second starting medium are provided in the cylindrical hollow percussion piston 31 functioning as the first actuator whilst at least one opening 48 is provided in a base plate 34 of the percussion piston 31. Here, the base plate 34 functions as a further screen, additionally to the screen 1. The cylindrical percussion piston 31 and the drive piston 32 function as an actuator as in the embodiment of FIG. 7.

As depicted in principle in FIG. 8, in this special embodiment, the at least one opening 3 in the screen 1 and the at least one opening 48 in the base plate 34 of the cylindrical percussion piston 31 are arranged centrally one above the other, the diameter of the opening 3 being larger than that of the opening 48.

The formation of the liquid films 6 and 6a in the case of a raised drive piston 32 is shown in FIG. 8.1. An additional starting medium is introduced into the cavity in the percussion piston 31 via the feed line 14a with the consequent formation of a liquid film 6a.

In this embodiment, the liquid film 6 is structurally limited by the base plate 34 of the percussion piston 31, whilst the liquid film 6a is structurally limited by the floor area of the drive piston 32 in the percussion piston 31.

The conditions existing immediately after the transmission of the impact forces by the drive piston 32 to the percussion piston 31, as well as to the capillary liquid in the opening 48, are illustrated in FIG. 8.2. Due to the impact, the capillary liquid in the opening 48 experiences an acceleration along the impact-normal 5 and is pushed through the underlying liquid film 6 into the opening 3 in the form of a micro-particle 7a accompanied by an additional layer consisting of the liquid in the underlying liquid film 6, although a complete discharge has not yet taken place. The micro-particle 7a, which comprises a core surrounded by a layer, is preformed in this way.

A second impact transmission along the impact-normal 5 is produced by the impact of the percussion piston 31 on the screen 1, as is illustrated in FIG. 8.3. Due to the second impact, the pre-formed micro-particle 7a incorporating a core, which is located in the opening 3, experiences an acceleration along the impact-normal and is then discharged completely from the device in the form of a separate liquid micro-particle 7 comprising a core.

The individual phases of this variant of the method in accordance with the invention, which comprise the formation of the liquid films 6, 6a according to FIG. 8.1 and subsequently a first separation involving the production of the micro-particle 7a according to FIG. 8.2 as well as a second separation and complete discharge of the two-layered micro-particle 7 according to FIG. 8.3, are effected in alternating periodic intervals in dependence on the selected frequency of movement of the percussion piston 31 and the drive piston 32 functioning as an actuator and the selected flow speed of the liquids through the supply lines 14, 14a.

The interruption of the liquid supply can be effected, advantageously, by the movement of the piston 31 and that of the drive piston 32 as illustrated here.

Figure 9:
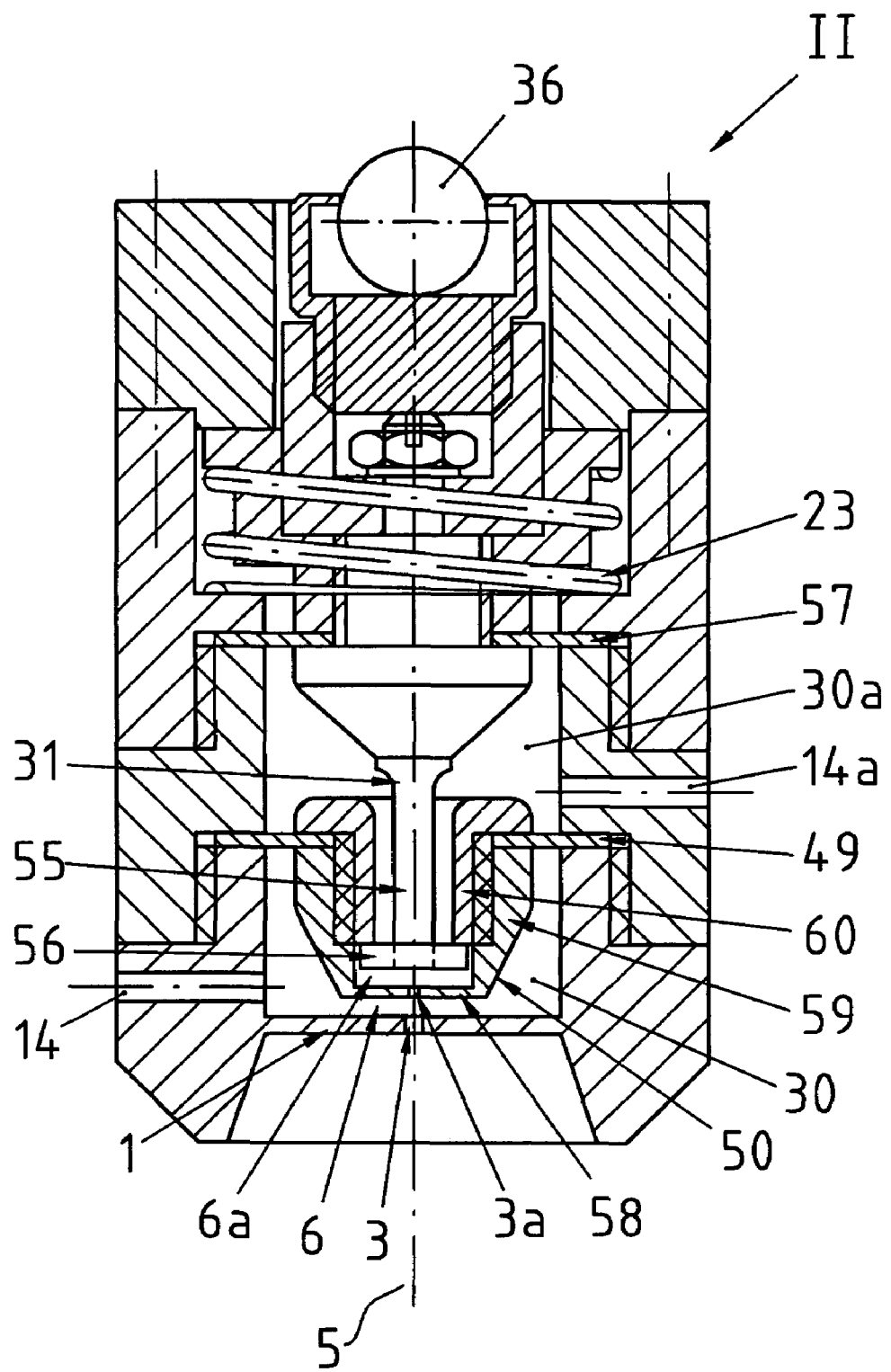
FIG. 9 an exemplary embodiment of a device in accordance with the invention for the production of droplets having a core and cladding of a preferred design.

FIG. 9 shows the cross-section through a further particularly preferred embodiment of the device in accordance with the invention utilising a push-type method of functioning. The device of FIG. 9 is specially conceived for the production of particles having a core and a cladding.

The mechanical impulses or impacts are produced here by a not illustrated, separate impact drive I and are transmitted to the liquid films 6, 6a by an impact receiver 36, incorporating the adjusting device 23, via the constructional components functioning as an actuator.

As shown here, the impact receiver may be a ball. However, any arbitrarily designed constructional component which is suitable for the reception and transmission of impacts could also be employed as an impact receiver.

The device comprises a lower dosing chamber 30 and an upper dosing chamber 30a, which are separated from each other by a moveable membrane 49 incorporating a rigid central section 50. Here, the rigid central section 50 takes the form of a cylinder which is open towards the upper dosing chamber 30a and into which there projects the piston 31 serving as an actuator.

The membrane 49 may, for example, be a flat membrane, a bead shaped membrane, a plate-like membrane or a roll membrane. The membrane 49 is connected firmly to the rigid central section 50. It may be vulcanised thereto for this purpose.

The membrane 49 can be manufactured from any material insofar as the desired mobility or elasticity can be ensured. It can be made of a flexible inorganic or organic material.

The upper, second dosing area 30a is closed upwardly with respect to the extruder housing, for example, it may be sealed by means of a seal 57 which, preferably, could likewise be a membrane as shown here. Both dosing chambers 30, 30a are equipped with supply lines 14, 14a that can be charged with a starting medium.

The piston 31 is composed of a piston shaft 55 and a percussion surface 56. Here, the diameter of the percussion surface 56 is of virtually the same size as the internal diameter of the cylindrical central section 50. The piston shaft 55 preferably has a smaller diameter than the percussion surface 56 as shown in FIG. 9.

The periphery of the percussion surface 56 is provided with through borings (not shown) through which the dosing chamber 30a is connected to the surface of a base plate 58 of the cylindrical central section 50. In addition, the base plate 58 itself comprises at least one opening 3a which is preferably arranged centrally above the at least one opening 3 in the impact screen 1.

If a liquid starting medium is fed into the upper dosing chamber 30a, the upper dosing chamber 30a fills up with the starting medium which reaches the base plate 58 of the cylindrical central section 50 via the through borings in the percussion surface 56 of the piston 31 and forms a liquid film 6a there. The thickness of the liquid film 6a can be adjusted in dependence on the length of the actuator stroke of the piston 31, i.e. in dependence on the spacing between the lower surface of the percussion surface 56 and the base plate 58. In this embodiment, the base plate 58 of the central section 50 serves as a further screen.

As in the preceding embodiments, the actuator stroke can be affected in any suitable manner, for example, mechanically by means of the adjusting device 23 and/or by means of the pressure exerted by the liquid film 6a being formed. Again, a compression spring could be used as the adjusting device 23.

A liquid film 6 is formed in like manner between the upper surface of the impact screen 1 and the lower surface of the base plate 58 of the cylindrical central section 50 when the lower dosing chamber 30 is filled with a liquid starting medium.

In the embodiment shown in FIG. 9, the delimitation of the liquid films 6, 6a is formed by the lower surface of the base plate 58 of the cylindrical central section 50 and the upper face of the impact screen 1 (liquid film 6), and also by the lower surface of the percussion surface 56 of the piston 31 and the upper face of the base plate 58 of the cylindrical central section 50 (liquid film 6a).

For the purposes of forming the liquid particles, the piston 31 strikes against the base plate 58 whereby capillary liquid is squeezed out from the opening 3a in the base plate 58, the squeezed-out liquid volume then passes the fluid film 6 taking some liquid along therewith as an outer cladding and reaches the opening 3.

Due to the percussive effect of the piston 31, the central section 50 is simultaneously moved against the impact screen 1 whereby the previously formed liquid droplet consisting of a core and outer cladding emerges completely from the opening 3.

The phases involving the formation of the liquid films as well as the formation and discharge of the liquid droplet consisting of a core and cladding that are gone through in accordance with this embodiment thereby correspond to the phases such as have been described with reference to FIGS. 8.1 to 8.3.

As shown in FIG. 9, the actuator stroke of the piston 31 can be limited upwardly by appropriately mounted projections in the inner wall of the cylindrical central section 50 by means of which the internal diameter of the cylindrical central section 50 is made smaller than the diameter of the percussion surface 56 of the piston 31 so that the percussion surface 56 will be pressed against this projection from below.

Not only does this arrangement result in a delimitation of the actuator stroke and thus of the thickness of the liquid film 6a, but, at the same time and in an advantageous manner, the region in which the liquid film 6a is formed will be sealed with respect to the remainder of the dosing chamber 30a so that an optimal impact transmission is possible.

The manner of mounting and attaching the edges of the membrane 49 as well as those of the membrane used as a seal 57 is quite arbitrary.

As shown in FIG. 9, the cylindrical rigid central section 50 may be composed of a plurality of constructional components, two shown in FIG. 9. The connection of the two constructional components 59, 60 is preferably effected by means of a screw-type connection, clamping of the membrane 49 being effected simultaneously with the making of the screw-type connection.

In FIG. 9, these two constructional components 59, 60 are indicated by differently oriented shadings, whereby the screw thread is indicated by the intersection of the shading lines.

Hereby, the central section 50 comprises a first cylindrical constructional component 59 which forms the base plate 58 whilst the side walls thereof end below the membrane. A thread is preferably located in the upper part of the inner wall of the first constructional component 59. A second tubular constructional component 60, which has a projecting edge at the upper end thereof, is screwed into this thread. In the screwed-in state, the lower end of this second tubular constructional component 60 forms the protruding shoulder against which the percussion surface 56 is pressed when the piston 31 is in its raised state.

The projecting upper end serves for clamping the membrane. In this embodiment, the membrane 49 is thus clamped between the top edge of the first cylindrical constructional component and the projecting top edge of the second tubular constructional component.

The device of FIG. 9 could likewise be converted into a device for the production of single layer micro-particles by using a central section 50 without an opening 3a.

Figure 10:
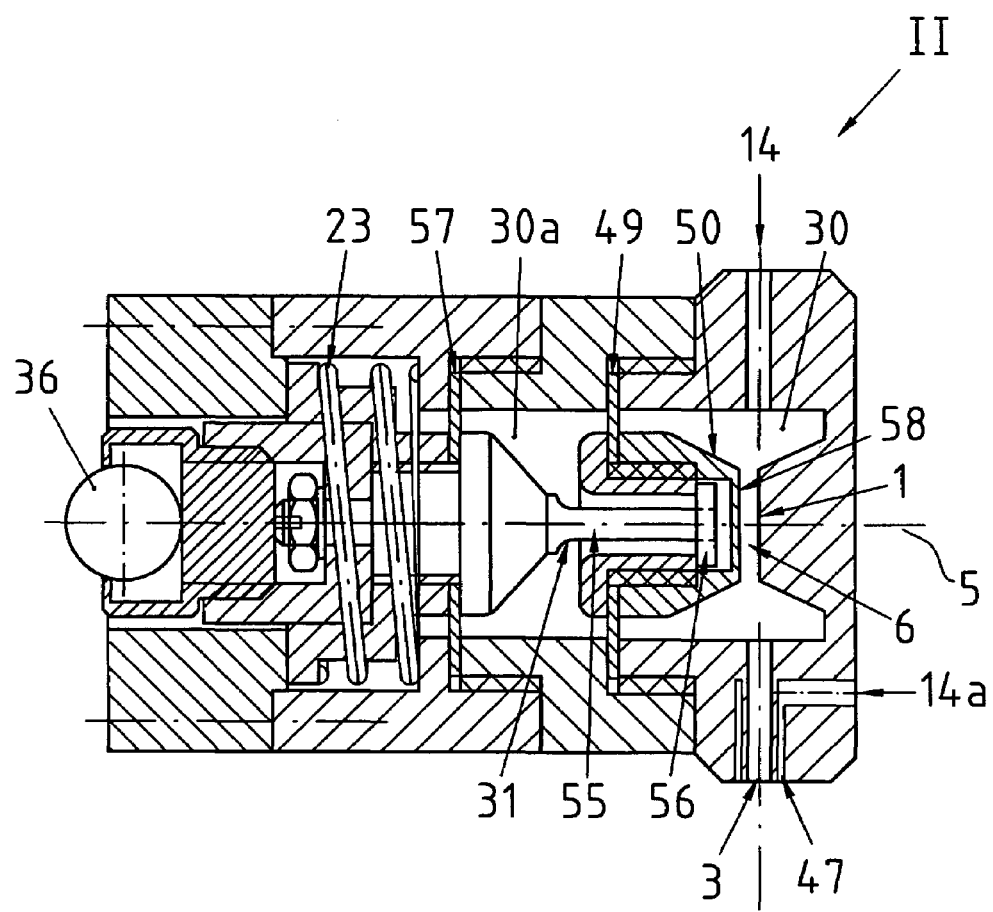
FIG. 10 a second exemplary embodiment of a device in accordance with the invention for the production of droplets having a core and cladding of a preferred design.

The exemplary embodiment shown in FIG. 10 is a micro-particle extruder II for producing multi-layered particles. The impact drive I is of the push-type.

The construction of the device illustrated in FIG. 10 is basically the same as that of the previously described embodiment illustrated in FIG. 9, so that only the differences of the embodiment shown will be discussed hereinafter. In the exemplary embodiment illustrated in FIG. 10, the impact on the droplet takes place at an angle of 90° compared with the exemplary embodiment shown in FIG. 9. The essential difference lies in the arrangement of the supply lines 14, 14a for the starting medium, and also in the location of the opening 3.

The opening 3 is positioned at an angle of 90° relative to the impact-normal 5. The supply line 14 for the dosing chamber 30 is located opposite thereto. An additional opening 47 in the form of an annular gap surrounds the opening 3 which is implemented as a cylindrical capillary, the annular gap being connected to a supply line 14a. Here, the dosing chamber 30a only represents the free space for the piston 31 functioning as an actuator. Moreover, in contrast to FIG. 9, the base plate of the cylindrical rigid central section 50, as well as the impact screen 1 arranged opposite thereto, are implemented without an opening.

FIGS. 10.1 and 10.2 show the individual phases involved in the production of the micro-particles. In general terms, the course followed by the method in accordance with the embodiment shown in FIG. 10 can be described by three—periodically repeating—phases: The first phase, which is illustrated in FIG. 10.1, involves the formation of a liquid film 6 when the actuators comprised by the percussion piston 31 and the central section 50 are raised, the second phase is the one in which a straight-line impact is transmitted from the percussion piston 31 to the central section 50 by the connection of the two actuators, whilst the third phase, which is illustrated in FIG. 10.2, involves the transmission of an impact from the rigid central section 50 to the liquid film 6 as well as to the fixed counter-body, the screen 1, whereby the capillary liquids 9, 9a emerging from the openings 3, 47 experience a disturbance parallel to the direction of the impact-normal due to the transmission of the impact and are portioned as liquid droplets 7.

With reference to FIGS. 5 and 6, the nearness of approach of the rigid central section 50, implemented as an actuator, with respect to the counter-body, here, the impact screen 1, can again be adjusted in dependence on the material properties of the starting media.

In FIG. 10.2, the base plate 58 of the rigid central section 50 and the impact screen 1 touch one another for a short period. This setting is particularly advantageous for high viscosity starting media. In a setting that is advantageous for low viscosity starting media, the base plate 58 does indeed approach the impact screen 1 but does not in fact touch it in analogy with FIG. 8.2.

The concrete constructional embodiments depicted hereinabove serve for explaining the principle underlying the invention in regard to a method for the production of micro-particles and a device therefor, although the invention is not restricted to these concrete embodiments but rather, arbitrary arrangements and modifications thereof are also comprised thereby. Thus, each of the embodiments and arrangements used for obtaining single-layer micro-particles is equally applicable to the production of multi-layered micro-particles.

Thus, the shape, the arrangement and the number of openings 3, 3a, 48 for the discharge of droplets can be varied in dependence on the particular requirement.

The diameter of the openings generally depends on the diameter desired for the solid particles 8 that are to be formed. The diameter of the openings is usually selected to be somewhat greater than the diameter of the particles 8 that are to be formed. A suitable ratio between the diameter of the openings and the diameter of the particles is approx. 0.6-0.7. Suitable diameters for the openings lie in a range from approximately 0.1 mm to 3.5 mm for particle diameters of approximately 0.15 mm to approximately 6 mm. However, the diameter of the openings can be varied in dependence on the need.

The openings may be located in a screen as illustrated in the embodiments of FIGS. 1-4 and 7-9, or the opening may be arranged at an arbitrary angle relative to the impact-normal as shown in FIGS. 5, 6 and 10, it could be arranged centrally or at an angle of 90° to the impact-normal.

For the production of multi-layered particles, two and more screens or constructional components functioning as screens and incorporating openings for the discharge of the particles can be arranged above one other as shown in FIGS. 8 and 9.

The size and shape of the percussion surface of the constructional components functioning as an actuator can be selected in dependence on the need. For example, a conical feed piston having a flattened peak could be selected.

A resilient or flexible constructional component may be used as the adjusting device 23. Examples of this are springs or flexible membranes, seals, etc. The membranes could, for example, have compressed air applied thereto. The device could also comprise two and more adjusting devices, in depending on the need.

A micro-particle extruder may comprise one or more impact devices. The throughput performance is determined by the number of impact devices employed as well as by the number of openings in the impact screen or the impact screens.

The alignment with respect to the solidifying medium V and/or the spacing between the micro-particle extruder II or the impact devices III and the solidifying medium V can be selected at will, depending on the need.

In approximate terms, particles having a diameter of, for example, 150 µm to 6000 µm with throughput performances of 1 l/h to 40 l/h can be obtained when using just a single impact device in accordance with the invention having merely one opening in the impact screen 1.

For a corresponding micro-particle extruder having a diameter of 100 mm and 5 openings in the screen, one could accordingly calculate a throughput performance of approximately 1 l/h to 800 l/h or, when using 40 micro-particle extruders on a surface area of 1 m², of 40 l/h to 32,000 l/h.

FIGS. 11.1 to 12.2 schematically show differently implemented impact drives I in accordance with the invention for the production of high frequency impacts. These impact drives are particularly suitable for the micro-particle extruders II illustrated in FIGS. 9 and 10, but could also be employed in the other embodiments.

For the purposes of producing high frequency impacts, these impact drives contain a plurality of impact elements 39 for the transmission of impacts to the micro-particle extruder II.

An exemplary embodiment of an impact drive I in accordance with the invention is illustrated in FIGS. 11.1 and 11.2. Here, the impact elements 39 are implemented in the form of cylindrical constructional components, for example, in the form of rollers. The ends of the impact elements 39 are located between two drive disks 41 and may be set in place in a fixed or moveable manner. There are free spaces 40 between the respective impact elements 39, thus resulting in an arrangement wherein there is an alternating sequence of impact elements 39 and free spaces 40. The drive disks 41 are connected to a drive shaft 42. The drive shaft 42 is mounted in rotational manner in a housing, for example, and is connected to a motor 4.

In this embodiment, the micro-particle extruder II is arranged centrally below the drive shaft 42 and is located at a certain distance from the circular path 43 of the impact elements 39, and it is advantageous for it to be fixed firmly in a mounting 38.

The impact receiver 36 in the micro-particle extruder serves for receiving and transmitting the impacts or impulses and for converting the impacts or impulses into a linear direction of motion.

The impact receiver 36 is a moveable element. For example, it can be implemented as a moveable ball or roller mounted in a sleeve.

In operation—as illustrated in FIGS. 11.1 and 11.2—, the motor 4 causes the drive shaft 42 and hence the impact elements 39 to rotate. The impact elements 39 then arrive successively at the impact receiver 36 during the rotation thereof about the axis of the drive shaft 42.

The impact receiver 36 gives way to the impact element 39 in a downward linear direction and thus transmits a straight-line impact along the impact-normal 5, this impact being transmitted via further constructional components implemented as actuators to one or more liquid films in accordance with the explanations provided hereinabove.

Due to the following free space 40, the impact receiver 36 is restored to its original position prior to the impact by the pre-tensioned adjusting device 23. The whole process repeats in a rapidly alternating sequence.

A second exemplary embodiment of an impact drive (I) in accordance with the invention is shown in FIGS. 12.1 and 12.2.

The impact elements 39—implemented here in the form of cylindrical constructional components—are arranged in the axial direction of the micro-particle extruder (II) and are also equally spaced around the axis of a drive shaft 42. The impact elements 39 are fixed to a drive disk 41 or, for example, are inserted therein in a moveable manner in the form of balls. The micro-particle extruder is again located below the impact elements 39, being firmly fixed in a mounting 38 for example. The motor 4 causes the drive shaft 42 to rotate together with the drive disk 41 and the impact elements 39, this thereby producing a straight-line transmission of an impact via the impact receiver 36 of the micro-particle extruder 11 due to the alternating sequence of an impact element 39 and a free space 40.

Only a maximum number of revolutions can be set using one motor—under the condition that the torque necessary for the impulsive force should be maintained.

Consequently, drives having only one impact element 39, a guide piston 21 as in the embodiment of FIG. 7 for example, can produce impulsive forces having a maximum frequency which corresponds to the maximum motor speed.

$$\text{Impulsive force frequency [Hz]=maximum motor speed } [s^{-1}]$$

However, when using the impact drive in accordance with the invention having a multiplicity of impact elements 39, substantially higher impulsive force frequencies can be produced in dependence on the selected number "k" of the impact elements 39.

$$\text{Impulsive force frequency [Hz]}=k\times(\text{maximum motor speed } [s^{-1}])$$

For example, a linear impulsive force frequency or impulse frequency of 12,000 Hz can be produced using a motor having a maximum rotational speed of 72,000 $min^{-1}$ (=1,200 $s^{-1}$) as the drive in a device in accordance with the invention having k=10 impact elements.

Since the impulsive force frequency corresponds to the number of liquid volumes separated from the liquid film per unit of time, then, when utilising this setting, approximately 12,000 portions of micro-particles can be produced per second using an impact device (III) in accordance with the invention.

In principle, the transmission of power from the drive to the device, in particular from the impact element to the impact receiver, can be effected in an arbitrary manner, for example, it could also be effected by means of magnetic force such as an attractive or repulsive magnetic force. In the case of a repulsive magnetic force for example, the impact element and the impact receiver will not touch one another.

FIG. 13 shows in schematic manner a device in accordance with the invention utilising a micro-particle extruder II incorporating an impact device III, an impact drive I and a supply line 14 for the starting medium.

In the embodiment shown here, the formed liquid micro-particles 7 leave the opening 3 in the direction of the impact-normal 5 and move in a linear manner towards an environment V that can effect the solidification process. If, after leaving the opening 3, the droplets 7 continue their flight in a linear direction, individual micro-particles 7 can combine into larger droplets due to the different speeds at which the micro-particles 7 are falling, this thereby leading to a wide distribution in size of the solid micro-particles 8.

In accordance with the invention, an unwanted coalescence of the liquid droplets 7 can be avoided if the droplets 7 are caused to move along a spiral flight path 44.

This is particularly advantageous in the case of the impact drives of FIGS. 11.1 to 12.2 i.e. when utilising higher impact frequencies from 100 Hz up to 12,000 Hz for the formation of a mono-dispersed distribution of the droplet sizes.

As in an exemplary embodiment which is illustrated in FIG. 13 and will be described hereinafter in more detail, the combining of individual micro-particles 7 into larger droplets can be prevented if, in accordance with the invention, the micro-particles 7 are led towards the environment V effecting the solidification process along a spiral path 44. The production of a spiral path 44 for the droplets can, for example, be produced by a high voltage device IV arranged below the micro-particle extruder II.

To this end, a constructional component implemented in the form of a hollow cylinder 10 is arranged below the micro-particle extruder, this component being open at least at the side where the droplets make their entrance. The hollow cylinder 10 can be set into rotary motion about its longitudinal axis by means of a motor 4. The hollow cylinder 10 is implemented as an electrical insulator. An electrically conducting slip-ring 15 surrounds the outer casing surface of the hollow cylinder 10 and is firmly connected thereto. The slip-ring 15 is connected in conductive manner via a loosely seated contact brush 17 to a high voltage generator 61. When the hollow cylinder 10 rotates together with the slip-ring 15 about the longitudinal axis of the hollow cylinder 10, there should always be a conductive connection with the contact brush 17 and thus between the high voltage generator 61 and the slip-ring 15. For this purpose, the contact brush 17 can be fixed to a mounting 45 outside the hollow cylinder 10 in order to fix the position thereof.

The connection of the outer slip-ring 15 to the internal casing surface of the hollow cylinder 10 is implemented by means of a connecting line 16 which is, in turn, connected to a high voltage electrode 18. It is preferable that the end of the connecting line 16 should simultaneously form the high voltage electrode 18. To this end, an end piece of the connecting line 16 can be bent downwardly in the direction of the longitudinal axis of the hollow cylinder 10 and be fixed to the internal casing surface of the hollow cylinder 10.

Consequently, the slip-ring 15 as well as the high voltage electrode 18 will be caused to rotate during the rotation of the hollow cylinder 10 about the longitudinal axis thereof.

The contact brush 17 is fixed and rests on the slip-ring 15.

The hollow cylinder 10 could be equipped with a plurality of slip-rings 15 and high voltage electrodes 18 which are likewise connected to the high voltage generator 61 in electrically conductive manner. In like manner, the number of contact brushes 17 can be varied as required.

Figure 13:
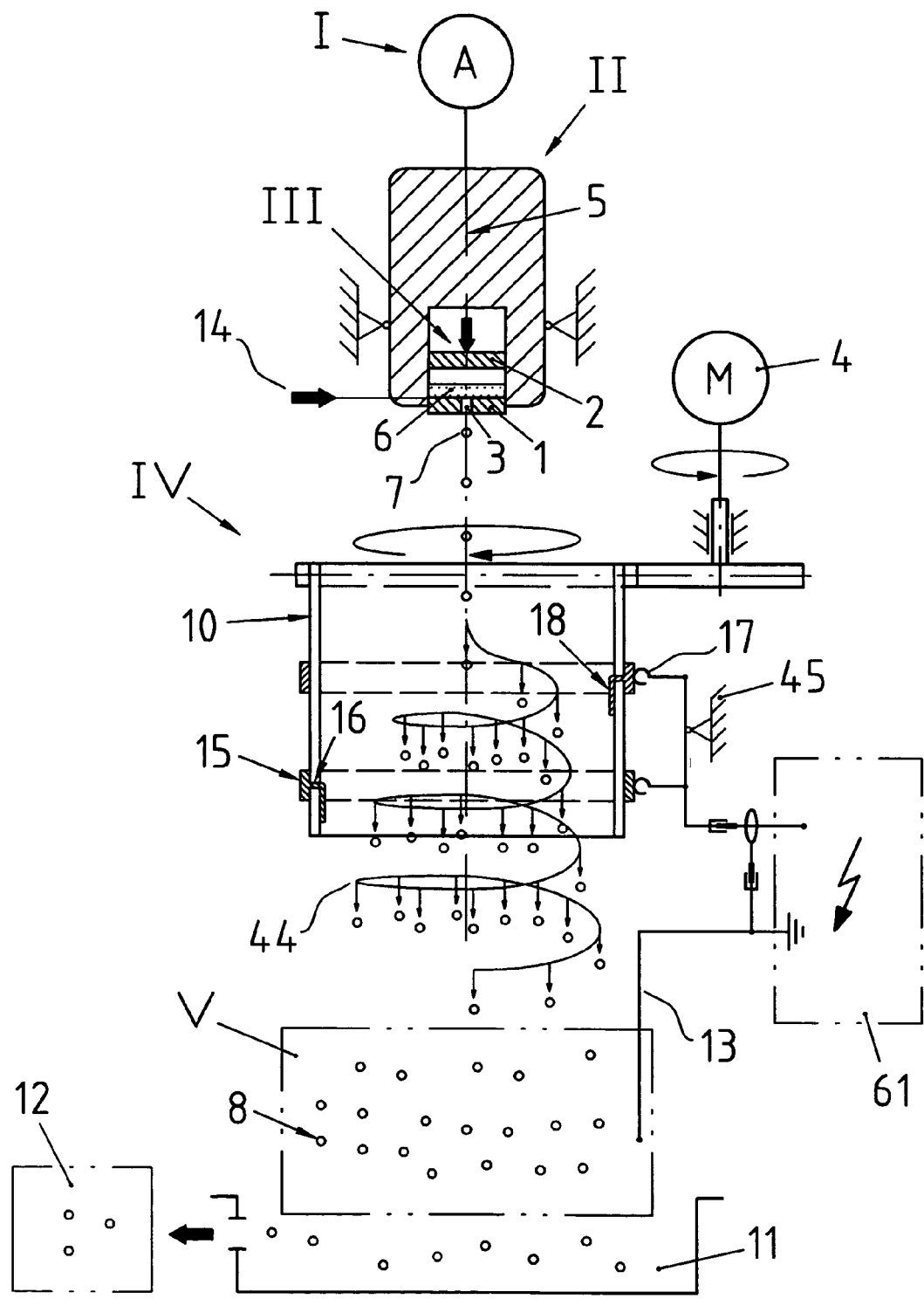
FIG. 13 an exemplary embodiment of a high voltage device in accordance with the invention for moving particles along a spiral path.

By way of example, two high voltage electrodes 18, which are located at opposite sides, are shown in FIG. 13. The grounding of the arrangement is effected by means of a grounding wire 13—here for example, to the solidification environment V. In use of the high voltage generator 61, the electrical voltages can, for example, be adapted to the particular conditions in step-less manner between 0 and 100 KV at a maximum amperage of 0.2 mA.

In operation, the hollow cylinder 10 preferably rotates uniformly about its longitudinal axis. The number of revolutions can be adjusted by means of the motor 4. At the same time, an electrical charge is transferred by the fixed contact brushes 17 to the moving high voltage electrodes 18 via the rotating slip-rings 15 and the connecting lines 16. The electrical charge is only induced on the outer surface of the high voltage electrodes 18 which additionally change their position in accord with the selected number of revolutions due to their rotation about the longitudinal axis of the hollow cylinder 10.

The micro-particles 7 fall through the interior of the rotating hollow cylinder 10. Due to the charge-dependent attraction and deflection of the particles 7, the dipole molecules of the micro-particles 7, which generally consist of aqueous liquids, are aligned and deflected in pole-related manner with respect to the high voltage electrodes 18 that are rotating about the longitudinal axis of the hollow cylinder 10, i.e. an additional movement about the longitudinal axis of the hollow cylinder 10, which occurs at a certain distance therefrom, is thus superimposed on the corresponding progressive movement of the micro-particles 7 along a downwardly directed straight line, thereby producing the resulting total movement of the particles 7 along a spiral path 44 toward the solidification medium V.

The solid micro-particles 8 formed thereby in a monodispersed size distribution can be collected in a device 11 and/or can be continuously supplied by way of suitable conveyor-type components to a further processing arrangement 12, for example, a rinsing or a sterile filling arrangement.

For the purposes of transmitting the impulses magnetically, either the at least one impact element 39 of the impact drive and/or an impact receiver 36 of the micro-particle extruder can be formed entirely or at least partially of a magnetic material, and in particular, of a ferromagnetic material.

LIST OF REFERENCES

I impact drive
II micro-particle extruder
III impact device
IV high voltage device
V solidifying environment
1 impact screen
2 impact mass
3, 3*a* opening
4 motor
5 impact-normal
6, 6*a*, 6*c* liquid film
7, 7*a* droplet
8 solidified particle
9, 9*a* capillary liquid
10 hollow cylinder
11 collecting device
12 further processing arrangement
13 earthing wire
14 14*a* supply line for the starting medium
15 slip-ring
16 connecting line
17 contact brush
18 high voltage electrode
19 eccentric shaft
20 eccentric cam crank
21 guide piston
22 drive housing
23 adjusting device
24
25 mounting plate
26 seal
27 seal
28 extruder housing
29 opening in the mounting plate 25
30, 30*a* dosing chamber
31 percussion piston (also referred to as a cylindrical hollow body)
32 drive piston
33 seal
34 base plate of the percussion piston 31
35 air chamber
36 impact receiver
37
38 mounting (extruder housing)
39 impact element
40 free space
41 drive disk
42 drive shaft
43 circular path
44 spiral path
45 mounting
46
47 annular gap opening
48 opening in the percussion piston base plate 34
49 moveable membrane
50 rigid central section
51
52
53
54
55 piston shaft
56 percussion surface
57 seal
58 base plate of the cylindrical rigid central section 50
59 1$^{st}$ constructional component
60 2$^{nd}$ constructional component
61 high voltage generator

The invention claimed is:

1. A method for the production of solid particles from a liquid starting medium, wherein liquid droplets are separated from the starting medium on a portion-by-portion basis and the liquid droplets are introduced into an environment which is effective to solidify the liquid droplets and thereby form the solid particles, the method comprising the steps of:

forming a liquid film from the liquid starting medium between an impact screen and an impact mass and over at least one opening, moving the impact mass along an impact axis to effect a mechanical impulse on the liquid film, such that a part of the liquid film and a capillary liquid formed in the at least one opening is discharged through the at least one opening in the form of liquid droplets, wherein transmission of the impact is effected onto a liquid film which is uniform during operation.

2. The method of claim 1 wherein the transmission of the impulse takes place in a straight line.

3. The method of claim 1 wherein the transmission of the impulse takes place centrally of the opening.

4. The method of claim 1 wherein the discharge of the droplets takes place at an angle to the impact axis.

5. The method of claim 1 wherein the liquid film is of uniform thickness at least in the area affected by an actuator.

6. The method of claim 1 wherein both the impact screen and the impact mass are moveable actuators.

7. The method of claim 1 wherein there is provided a cylindrical hollow body having a moveable piston therein, the transmission of the impulse being caused by the movement of the piston in the cylindrical hollow body.

8. The method of claim 1 wherein the formed solid particles comprise a core and at least one cladding layer.

9. The method of claim 8 wherein different starting media are used for forming the solid particles having a core and at least one cladding layer.

10. The method of claim 1 wherein the discharged liquid droplets are fed along a spiral flight path.

11. The method of claim 1 wherein the strength of the impulse is adjusted by at least one measure selected from the length of the stroke of the impact mass, the size of the percussion surface of the impact mass, the impact screen, and by the nearness of approach of the impact mass with respect to the impact screen.

12. A device for the production of solid particles from a liquid starting medium, the device comprising a microparticle extruder incorporating at least one impact device, the impact device comprising:

at least one impact screen for supporting on a surface thereof a film of the liquid starting medium, an impact mass, and at least one opening in said impact screen for the discharge of liquid droplets, wherein at least one of said impact screen and said impact mass comprises a moveable actuator for the transmission of a mechanical impulse to the liquid film, a structural boundary for separating the liquid film from the impulse transmitting actuator, wherein the actuator strikes, the structural boundary for the purposes of transmitting the impulse, and the actuator and the structural boundary are spaced from each other.

13. The device of claim 12 wherein the impactmass is the moveable actuator and the impact screen forms a fixed counter-body.

14. The device of claim 12 wherein the impact mass comprises a cylindrical hollow body having a base plate, and a further moveable piston is provided in the cylindrical hollow body for the purposes of transmitting the impulse.

15. The device of claim 14 wherein the interior of the cylindrical hollow body is connected to at least one supply line for the liquid starting medium, and wherein the base plate functions as an additional impact screen arranged above the first impact screen and comprises at least one opening which is arranged above the corresponding opening in the impact screen whilst the diameter thereof is smaller than the diameter of the corresponding opening in the impact screen.

16. The device of claim 14 and further comprising a moveable membrane, wherein the liquid film is separated from the impulse transmitting actuator by said moveable membrane which is provided with a rigid central section.

17. The device of claim 16 wherein the rigid central section comprises an upwardly open cylinder.

18. The device of claim 17 wherein the interior of said cylinder is connected to at least one supply line for the liquid starting medium, and the base plate of the rigid central section functions as the impact screen and comprises at least one opening which is arranged above a corresponding opening in the impact screen.

19. The device of claim 12 wherein the device comprises two or more impact screens which are arranged one above the other, said screens each incorporating at least one opening, wherein the diameter of the at least one opening in the upper one of the impact screens increases towards the impact screen located therebelow, and the openings are arranged one above the other.

20. The device of claim 12 wherein the device further comprises an impact receiver for the transmission of an impulse produced by an impact drive to the device, and at least one adjusting device for resetting at least one of the impact receiver and the actuator into an initial position prior to the impulse.

21. The device of claim 12 wherein the opening is surrounded by an annular gap for the supply of a further starting medium.

22. The method of claim 1 and comprising the further step of directing the liquid droplets to a solidification medium wherein the droplets are solidified to form the solid particles.

23. The device of claim 12, further comprising a solidification medium disposed to receive the liquid droplets and adapted to solidify the droplets to form the solid particles.

24. The device of claim 12 further including a device for the production of a spiral flight path for droplets and including:

a hollow cylinder rotatable about its longitudinal axis and open at least in a direction of entry of the droplets, at least one electrically conducting slip-ring which surrounds an outer surface of said hollow cylinder and is connected thereto, at least one fixed contact brush which rests loosely on said slip-ring and is connectable in conductive manner to a high voltage generator, at least one electrode arranged on an internal surface of said hollow cylinder and connected by a connecting line to the slip-ring, and a grounding wire.

25. The device of claim 24 wherein ends of the connecting line project into the interior of said hollow cylinder and form said at least one electrode.

26. The device of claim 12 further including an impact drive for the periodic transmission of a mechanical impulse, and including at least one impact element and a drive disk, said impact element being connected to said drive disk, and a drive shaft connecting said drive disk to a motor.

27. The device of claim 26 wherein said impact element is cylindrical and is arranged perpendicularly between two drive disks with spaces being provided between each two of said impact elements.

28. The device of claim 26 comprising a plurality of said impact elements and wherein said impact elements are arranged around an axis of said drive shaft on one side of said drive disk, and said drive shaft is attached perpendicularly to said drive disk.

29. The device of claim 26 wherein the transmission of the impulse is effected by a magnetic force, whereby a selected one of said at least one impact element and an impact receiver of a micro-particle extruder consists at least partially of a magnetic material.

* * * * *